(12) United States Patent  
Strosser et al.

(10) Patent No.: US 7,398,144 B2
(45) Date of Patent: Jul. 8, 2008

(54) APPARATUS AND METHOD TO CALIBRATE THE PTO WITH THE DISK OR SICKLE OF AN AGRICULTURAL WINDROWER

(75) Inventors: Richard P. Strosser, Akron, PA (US); Jeremy D. Peters, McConnellsburg, PA (US)

(73) Assignee: CNH America LLC, New Holland, PA (US)

( * ) Notice: Subject to any disclaimer, the term of this patent is extended or adjusted under 35 U.S.C. 154(b) by 168 days.

(21) Appl. No.: 11/487,730

(22) Filed: Jul. 17, 2006

(65) Prior Publication Data

US 2007/0012011 A1    Jan. 18, 2007

Related U.S. Application Data

(60) Provisional application No. 60/699,492, filed on Jul. 15, 2005.

(51) Int. Cl.
*G06F 7/70* (2006.01)
(52) U.S. Cl. ...................................... 701/50; 56/10.2 R
(58) Field of Classification Search .................. 701/29, 701/34, 36, 50, 70; 56/10.2 R, 10.2 GF, 10.2 H; 180/53.6–53.8
See application file for complete search history.

(56) References Cited

U.S. PATENT DOCUMENTS

| | | | |
|---|---|---|---|
| 4,372,265 A | 2/1983 | Kasiewicz | ................. 123/352 |
| 4,414,792 A | 11/1983 | Bettencourt et al. | .......... 56/10.2 |
| 4,662,472 A | 5/1987 | Christianson et al. | ....... 180/235 |
| 4,967,544 A | 11/1990 | Ziegler et al. | ................. 56/10.2 |
| 5,237,883 A | 8/1993 | Churchill et al. | ............... 74/11 |
| 5,310,974 A | 5/1994 | Churchill et al. | ............ 200/566 |
| 6,112,139 A | 8/2000 | Schubert et al. | ................ 701/2 |
| 6,151,874 A * | 11/2000 | Eis | .......................... 56/10.2 E |
| 6,169,953 B1 | 1/2001 | Panoushek et al. | ............ 701/99 |
| 6,546,705 B2 | 4/2003 | Scarlett et al. | ........... 56/10.2 R |
| 6,591,591 B2 | 7/2003 | Coers et al. | .............. 56/10.2 G |
| 6,865,870 B2 | 3/2005 | Heisey | ..................... 56/10.2 G |
| 6,901,729 B1 | 6/2005 | Otto et al. | ...................... 56/208 |
| 7,168,229 B1 * | 1/2007 | Hoffman et al. | .............. 56/208 |

* cited by examiner

*Primary Examiner*—Richard M. Camby
(74) *Attorney, Agent, or Firm*—Patrick M. Sheldrake; John William Stader; Michael G. Harms

(57) ABSTRACT

An apparatus and method for calibrating a PTO for driving a cutter of a header of an agricultural windrower, wherein a programmable control module in connection with at least signal operated device in operative control of a variable displacement pump operable for controlling operation of the PTO, is programmed as part of an automatic calibration routine for directing signals to the device having values which will increase over time from a first value toward a second value. At the same time, the control module determines when a first movement of the cutter occurs. If the first movement occurs before the second signal value is reached, information representative of an electrical signal corresponding to the first movement is stored. The routine is then repeated using a higher range of electrical signal values to calibrate where the cutter reaches max speed. In either instance, if the speed condition is not reached with the outputting of the signals within the range, the calibration fails.

16 Claims, 47 Drawing Sheets

```
Description:
*/
565  #ifdef ENGINEERING_TEST //rps2004oct261639
     __x=(((_pto_cal_value_ma_b3_si )*10)/BIN3);
     #else
     __x=(_pto_cal_value_ma_b3_si )/BIN3;
     #endif
570    return(&__x);
     }
     /*************************************************************/
     static void pto_calibrate(void)
575  {
        static unsigned char  _update_display_flag_b0_uc;
        static const void*    _pto_cal_msg;
        static signed int     _i_inc;
580     static signed long    _sum_header_rpm_b0_sl;
        static signed int     _header_max_test_rpm_b0_si;
        static signed int     _header_test_rpm_b0_si;
        static signed int     _draper_max_t_scans_b0_ui;

585     #define _itest_max    current_ma_b3_si( 170 )
        #define _initwait     _time_b0_ui2scans_sec_f( 3 )
        #define _calwait      _time_b0_ui2scans_sec_f( 3.0 )
        #define _cal_step     _time_b0_ui2scans_sec_f( 1.0 )

590     switch( _pto_cal_state_b0_ui )
        {
        case _PTO_CAL_STATE_INIT:       //Wait here until PTO Calibration is requested
            _fwd_itest = _rev_itest = _timer01 = _timer02 = _timer03 = _pto_cal_value_ma_b3_si = 0;
595         return;

case _PTO_CAL_STATE_BEGIN:
            _fwd_itest = _rev_itest;
            //Display a message here warning the operator before proceeding with cal that PTO will turn.
600         //Operator can also choose exit to stop the calibration
            _pto_cal_msg = _pto_cal_running_menu;
            if ( ++_timer02 > _initwait )
            {
                _timer02=0;
605             _pto_cal_msg = _cal_start_eng_menu;
                _pto_cal_state_b0_ui = _PTO_CAL_STATE_START_ENGINE;
            }
            if( _4_cylinder_b_xp )   //TBD - jpeters2004Jun021332 Change cal menu to only display pto Cal for 6D m
            {
610             _pto_cal_state_b0_ui = _PTO_CAL_STATE_CHECK_CONFIG;
                _timer02=0;
            }
```

Fig. 6

```
              break;

615    case _PTO_CAL_STATE_START_ENGINE:
          if( NeuStart_status_bt_xp() )
          {
              menu_change_focus( _cal_start_eng_menu, _type_menu_e );
620           _pto_cal_state_b0_ui = _PTO_CAL_STATE_WAIT_FOR_ENG_RUNNING;
          }
          else
          {
              menu_change_focus( get_neustart_message(), _type_menu );
          }
625       break;

case _PTO_CAL_STATE_WAIT_FOR_ENG_RUNNING:
          if ( !NeuStart_status_bt_xp() )
              _pto_cal_state_b0_ui = _PTO_CAL_STATE_START_ENGINE;
630       if( engine_running_b_xp )
          {
              _timer02 = 0;
              _pto_cal_state_b0_ui = _PTO_CAL_STATE_CHECK_FOR_HI_IDLE;
          }
635       break;

case _PTO_CAL_STATE_CHECK_FOR_HI_IDLE:
#ifdef PTO_CAL_UPDATE    //jrr2005june131430
       if( _6_cyl_pto_sickle_b_xp)
640        throttle_set_point( 900 );
       else
           throttle_set_point( 1300 );
#else
           throttle_set_point( 1300 );              //Set Engine Speed to 1300 rpm
#endif
645    if( ++_timer02 >= 200 )                      //Delay (2) Seconds to allow Engine to settle
       {
           _timer02 = 0;
           _pto_cal_state_b0_ui = _PTO_CAL_STATE_WAIT_FOR_PTO_SWITCH;
       }
650    break;

case _PTO_CAL_STATE_WAIT_FOR_PTO_SWITCH:
           _low_side_for_PTO_power_relay_on;         //turn on LSD to look for PTO switch
655        _pto_cal_msg = _pto_cal_wait_menu;
           if( _hdr_emerg_stop_debounced )
           {
                _pto_cal_state_b0_ui = _PTO_CAL_STATE_CALIBRATING;
           }
660    break;

case _PTO_CAL_STATE_CALIBRATING:
           _low_side_for_PTO_power_relay_on;         //turn on LSD to look for PTO switch
```

Fig. 7

```
665     _pto_cal_msg = _pto_cal_start_warning_menu;
        // TBD  Display some sort of message here warning the operator of the calibration mode.  PTO may begin
        if( ++_timer02 > _calwait )
        {
            _timer02=0;
670         if( _6_cyl_pto_draper_b_xp )
                _pto_cal_state_b0_ui = _pto_cal_state_DRAPER_CAL_INIT;
            else
                _pto_cal_state_b0_ui = _PTO_CAL_STATE_FWD_OFFSET;    //Disc or Sickle Header PTO Calibration
        }
675     //TBD - jpeters2004Jun101332 should seat switch state machine run in calibration mode?
        if( !_hdr_emerg_stop_debounced || !seat_switch_bt_xp )
        {
            _timer02=0;
680         _pto_cal_state_b0_ui = _PTO_CAL_STATE_FAILED;
        }
        break;

case _PTO_CAL_STATE_FWD_OFFSET:
685     _low_side_for_PTO_power_relay_on;                    //turn on LSD to look for PTO switch
        _pto_cal_msg = _pto_cal_running_menu;
        _rev_itest=0;
        if(_fwd_itest <= _itest_max)
        {
690         if( ++_timer02 > 20 )
            {
                _timer02=0;
                _fwd_itest += current_ma_b3_si( 1 );
            }
            if( ( _v_pto_rpm_b0 > 1 ) || _interactive_cal_proceed_flag_b0_uc )
            {
695             _timer02=0;
                put_ee_pto_fwd_offset_current_ma_b3_si( _fwd_itest );
                _pto_cal_value_ma_b3_si = EE_pto_fwd_offset_current_ma_b3_si;
                _pto_cal_state_b0_ui = _PTO_CAL_STATE_FWD_MAX;
            }
        }
700     else
        {
            _timer02=0;
            _fwd_itest = 0;
            _pto_state = _OFF;
705         _pto_cal_state_b0_ui = _PTO_CAL_STATE_FAILED;    //If over max current reset everything
        } if(  !_hdr_emerg_stop_debounced
710        || !seat_switch_bt_xp )
        {
            _timer02=0;
```

Fig. 8

```
715             _pto_cal_state_b0_ui = _PTO_CAL_STATE_FAILED;
            )
            break;
        case _PTO_CAL_STATE_FWD_MAX:
720         _low_side_for_PTO_power_relay_on;            //turn on LSD to look for PTO switch
#ifdef PTO_CAL_UPDATE   //jrr2005june131430
            _fwd_itest = .current_ma_b3_si( 135 );
        #else
725         if(_6_cyl_pto_sickle_b_xp)
                _fwd_itest = current_ma_b3_si( 75 );
            else
                _fwd_itest = current_ma_b3_si( 135 );
        #endif
730         _timer02=0;
            _pto_cal_state_b0_ui = _PTO_CAL_STATE_FWD_MAX_02;
            break;
        case _PTO_CAL_STATE_FWD_MAX_02:
            _low_side_for_PTO_power_relay_on;            //turn on LSD to look for PTO switch
735         if( ++_timer02 >= _time_b0_ui2scans_sec_f(5.00) )
            {
                _sum_header_rpm_b0_sl=0;
                _pto_cal_state_b0_ui = _PTO_CAL_STATE_FWD_MAX_03;
            }
740         break;
        case _PTO_CAL_STATE_FWD_MAX_03:
            _low_side_for_PTO_power_relay_on;            //turn on LSD to look for PTO switch
            if( ++_timer02 > _time_b0_ui2scans_sec_f(1.00) )
            {
745             _timer02=0;
#ifdef PTO_CAL_UPDATE   //jrr2005june131430
                _header_max_test_rpm_b0_si = (signed int)((_sum_header_rpm_b0_sl/_time_b0_ui2scans_sec_f(1.00))-25
                _i_inc = current_ma_b3_si( 16*2 );
                _fwd_itest = current_ma_b3_si( 103 );
750         #else
                if(_6_cyl_pto_sickle_b_xp)
                {
                    _header_max_test_rpm_b0_si = (signed int)(1750 / 2.5);
                    _i_inc = current_ma_b3_si( 8*2 );
755                 _fwd_itest = current_ma_b3_si( 75 );
                }
                else
                {
                    _header_max_test_rpm_b0_si = (signed int)((_sum_header_rpm_b0_sl/_time_b0_ui2scans_sec_f(1.00))-25
760                 _i_inc = current_ma_b3_si( 16*2 );
                    _fwd_itest = current_ma_b3_si( 103 );
                }
        #endif
765             _pto_cal_state_b0_ui = _PTO_CAL_STATE_FWD_MAX_05;
```

Fig. 9

```
                }
                else
                    _sum_header_rpm_b0_sl += _v_pto_rpm_b0;
770         break;
            case _PTO_CAL_STATE_FWD_MAX_04:
                _low_side_for_PTO_power_relay_on;           //turn on LSD to look for PTO switch
                _i_inc /= 2;

775             if( _header_test_rpm_b0_si > _header_max_test_rpm_b0_si )
                    _fwd_itest -= _i_inc;
                else
                    _fwd_itest += _i_inc;

780             if( _i_inc < current_ma_b3_si( 0.500 ) )
                    _pto_cal_state_b0_ui = _PTO_CAL_STATE_FWD_MAX_07;    //Forward Max Finished
                else
                {
                    _timer02=0;
785                 _pto_cal_state_b0_ui = _PTO_CAL_STATE_FWD_MAX_05;
                }
            break;
            case _PTO_CAL_STATE_FWD_MAX_05:
                _low_side_for_PTO_power_relay_on;           //turn on LSD to look for PTO switch
790             if( ++_timer02 >= _time_b0_ui2scans_sec_f(5.00) )
                {
                    _timer02=0;
                    _sum_header_rpm_b0_sl=0;
                    _pto_cal_state_b0_ui = _PTO_CAL_STATE_FWD_MAX_06;
795             }
            break;
            case _PTO_CAL_STATE_FWD_MAX_06:
                _low_side_for_PTO_power_relay_on;           //turn on LSD to look for PTO switch
                if( ++_timer02 > _time_b0_ui2scans_sec_f(1.00) )
800             {
                    _timer02=0;
                    _header_test_rpm_b0_si = _sum_header_rpm_b0_sl/_time_b0_ui2scans_sec_f(1.00);
                    _pto_cal_state_b0_ui = _PTO_CAL_STATE_FWD_MAX_04;
                }
805             else
                    _sum_header_rpm_b0_sl += _v_pto_rpm_b0;
            break;
            case _PTO_CAL_STATE_FWD_MAX_07:
                _low_side_for_PTO_power_relay_on;           //turn on LSD to look for PTO switch
810             put_ee_pto_fwd_max_current_ma_b3_si( _fwd_itest );
                _pto_cal_value_ma_b3_si = EE_pto_fwd_max_current_ma_b3_si;
                _fwd_itest=0;
                _timer02 = 0;
                _pto_cal_state_b0_ui = _PTO_CAL_STATE_CHANGE_DIRECTION;
815             if( !_hdr_emerg_stop_debounced
```

Fig. 10

```
            || !seat_switch_bt_xp )
        {
        _timer02=0;
        _pto_cal_state_b0_ui = _PTO_CAL_STATE_FAILED;
        }
    break;

case _PTO_CAL_STATE_CHANGE_DIRECTION:
        _low_side_for_PTO_power_relay_on;           //turn on LSD to look for PTO switch
        _fwd_itest = _rev_itest = _i_out_fwd_ma_b3_si = _i_out_rev_ma_b3_si = 0;      //Make sure it stops
        //if( _v_pto_rpm_b0 < 2)
        if( (++_timer02 > _calwait) && (_v_pto_rpm_b0 < 2) )   //Wait at least 3sec, more if pto not stopped
        {
        _timer02=0;
        _pto_cal_state_b0_ui = _PTO_CAL_STATE_REV_OFFSET;
        }
        if(
            !_hdr_emerg_stop_debounced
            || !seat_switch_bt_xp )
        {
        _timer02=0;
        _pto_cal_state_b0_ui = _PTO_CAL_STATE_FAILED;
        }
    break;

case _PTO_CAL_STATE_REV_OFFSET:
        _low_side_for_PTO_power_relay_on;           //Calibrate the Reverse coil just the same as the
        _fwd_itest=0;                               //turn on LSD to look for PTO switch
#ifdef PTO_CAL_UPDATE    //jrr2005june131430
        if( ++_timer02 > _cal_step )
        {
        _timer02=0;
            _rev_itest += current_ma_b3_si( 1 );
        } if( ( _v_pto_rpm_b0 > 1 ) || _interactive_cal_proceed_flag_b0_uc )
        {
        _timer02=0;
        put_ee_pto_rev_offset_current_ma_b3_si( _rev_itest );
        _pto_cal_value_ma_b3_si = EE_pto_rev_offset_current_ma_b3_si;
        _pto_cal_state_b0_ui = _PTO_CAL_STATE_REV_MAX;
        } if(
            !_hdr_emerg_stop_debounced
            || !seat_switch_bt_xp )
        {
        _timer02=0;
        _pto_cal_state_b0_ui = _PTO_CAL_STATE_FAILED;
        }
```

*Fig. 11*

```
      #else
870         //TBD - Get rid of disc specific values
            if
            (
               !(_6_cyl_pto_sickle_b_xp) && (_rev_itest <= _itest_max) && (_v_pto_rpm_b0 < 1000)
875         || (_6_cyl_pto_sickle_b_xp) && (_rev_itest <= _itest_max) && (_v_pto_rpm_b0 < (unsigned int)(250/2.5)
            )
            {
               if( ++_timer02 > _cal_step )
               {
                  _timer02=0;
880               if( _6_cyl_pto_sickle_b_xp )
                     _rev_itest += current_ma_b3_si( 1 );
                  else
                     _rev_itest += current_ma_b3_si( 5 );
               }
885            if( ( _v_pto_rpm_b0 > 1 ) || _interactive_cal_proceed_flag_b0_uc )
               {
                  _timer02=0;
                  put_ee_pto_rev_offset_current_ma_b3_si( _rev_itest );
890               _pto_cal_value_ma_b3_si = EE_pto_rev_offset_current_ma_b3_si;
                  _pto_cal_state_b0_ui = _PTO_CAL_STATE_REV_MAX;
               }
            }
            else
            {
               _timer02=0;
               _rev_itest = 0;
895            _pto_state = _OFF;
               _pto_cal_state_b0_ui = _PTO_CAL_STATE_FAILED;      //If over max current reset everything and end cal
            }
            if(
900            !_hdr_emerg_stop_debounced
               || !seat_switch_bt_xp )
            {
               _timer02=0;
905            _pto_cal_state_b0_ui = _PTO_CAL_STATE_FAILED;
            }
      #endif
            break;
910      case _PTO_CAL_STATE_REV_MAX:
            _low_side_for_PTO_power_relay_on;                   //turn on LSD to look for PTO switch
            _fwd_itest=0;
            //TBD - Get rid of disc specific values
915   #ifdef PTO_CAL_UPDATE   //jrr2005june131430
            if( ++_timer02 > _cal_step )
            {
               _timer02=0;
```

Fig. 12

```
920         _rev_itest += current_ma_b3_si( 1 );
      }
      if( _interactive_cal_proceed_flag_b0_uc
          || ( _6_cyl_pto_disc_b_xp && ( _v_pto_rpm_b0 >= velocity_rpm_b0_si(1000) ) )    //Take reverse secon
          || ( _6_cyl_pto_sickle_b_xp && ( _v_pto_rpm_b0 >= velocity_rpm_b0_si(320) )) )
      {
925     put_ee_pto_rev_max_current_ma_b3_si( _rev_itest );
        _pto_cal_value_ma_b3_si = EE_pto_rev_max_current_ma_b3_si;
        _timer02 = 0;
        _pto_cal_state_b0_ui = _PTO_CAL_STATE_SHOW_REV_MAX;
      }
930   if(
        !_hdr_emerg_stop_debounced
        || !seat_switch_bt_xp )
      {
935     _timer02=0;
        _pto_cal_state_b0_ui = _PTO_CAL_STATE_FAILED;
      }
else
940   if
      (
        !(_6_cyl_pto_sickle_b_xp) && (_rev_itest <= _itest_max) && (_v_pto_rpm_b0 < 1500)
        || (_6_cyl_pto_sickle_b_xp) && (_rev_itest <= _itest_max) && (_v_pto_rpm_b0 < (unsigned int)(500) )
      )
      {
945     if( ++_timer02 > _cal_step )
        {
          _timer02=0;
          _rev_itest += current_ma_b3_si( 1 );
        }
        //TBD - Base cal point on steady state velocity, so it is universal across header types
950     if( _interactive_cal_proceed_flag_b0_uc
            || ( _6_cyl_pto_disc_b_xp && ( _v_pto_rpm_b0 >= velocity_rpm_b0_si(1000) ) )   //Take reverse secon
            || ( _6_cyl_pto_sickle_b_xp && ( _v_pto_rpm_b0 >= velocity_rpm_b0_si((unsigned int)(300)) ) ) )
        {
955       put_ee_pto_rev_max_current_ma_b3_si( _rev_itest );
          _pto_cal_value_ma_b3_si = EE_pto_rev_max_current_ma_b3_si;
          _timer02 = 0;
          _pto_cal_state_b0_ui = _PTO_CAL_STATE_SHOW_REV_MAX;
        }
960   }
      else
      {
        _timer02=0;
        _rev_itest = 0;
965     _pto_state = _OFF;
        _pto_cal_state_b0_ui = _PTO_CAL_STATE_FAILED;     //If over max current reset everything and end cal
      }
      if(
```

Fig. 13

```
970             !_hdr_emerg_stop_debounced
                || !seat_switch_bt_xp )

_timer02=0;
            _pto_cal_state_b0_ui = _PTO_CAL_STATE_FAILED;
975 #endif
        break;
        case _PTO_CAL_STATE_SHOW_REV_MAX:
            if( ++_timer02 >= 300 )
980         (
                _timer02 = 0;
                _pto_cal_state_b0_ui = _PTO_CAL_STATE_SUCCESSFUL;
            )
985     break;

case _PTO_CAL_STATE_CHECK_CONFIG:
            //_low_side_for_PTO_power_relay_off;     //turn off LSD to unlatch PTO switch
            _rev_itest = _fwd_itest = _i_out_rev_ma_b3_si = _i_out_fwd_ma_b3_si = 0;
990         _pto_state = _OFF;
            _pto_cal_msg = _cal_check_config_menu;
            if(++_timer02 > _calwait )
            (
                _timer02=0;
995             _pto_cal_state_b0_ui = _PTO_CAL_STATE_EXIT;
            )
        break;

case _PTO_CAL_STATE_FAILED:
1000        //_low_side_for_PTO_power_relay_off;    //turn off LSD to unlatch PTO switch
            //indicate cal failure with beep
            Alarm_OneShot_1sec();
            _rev_itest = _fwd_itest = _i_out_rev_ma_b3_si = _i_out_fwd_ma_b3_si = 0;
            _pto_state = _OFF;
1005        _pto_cal_msg = _cal_failed_menu;
            if(++_timer02 > _calwait )
            (
                _timer02=0;
                _pto_cal_state_b0_ui = _PTO_CAL_STATE_EXIT;
1010    break;

case _PTO_CAL_STATE_SUCCESSFUL:
            _low_side_for_PTO_power_relay_off;     //turn off LSD to unlatch PTO switch
1015        _rev_itest = _fwd_itest = _i_out_rev_ma_b3_si = _i_out_fwd_ma_b3_si = 0;
            _pto_state = _OFF;
            _pto_cal_msg = _cal_success_menu;
            if(++_timer02 > _calwait)
            (
1020            _timer02=0;
                _pto_cal_state_b0_ui = _PTO_CAL_STATE_EXIT;
```

*Fig. 14*

```
       )
       break;
1025   case _PTO_CAL_STATE_EXIT:
       //_low_side_for_PTO_power_relay_off;        //turn off LSD to unlatch PTO switch
       _pto_cal_msg = _cal_ended_key_off;
       _rev_itest = _fwd_itest = _i_out_rev_ma_b3_si = _i_out_fwd_ma_b3_si = 0;
       _pto_state = _OFF;
       if(++_timer02 > _calwait)
1030   {
          _timer02=0;
          //_menu_change_focus(_calibrations_menu);
          //_pto_cal_state_b0_ui = _PTO_CAL_STATE_INIT;
       )
1035   break;
       case _pto_cal_state_DRAPER_CAL_INIT:
       _low_side_for_PTO_power_relay_on;           //Turn on LSD to look for PTO switc
       _pto_cal_msg = _pto_cal_running_menu;       //Show Calibration Message on Displ
       throttle_set_point( _throttle_setpt_rpm_b0_ui = 1300 );  //Increment Engine Speed
1040   _i_inc = current_ma_b3_si( 8*2 );           //Preset incremental current value.
       _fwd_itest = current_ma_b3_si( 63 );        //Preset test current value to nom
       _draper_max_t_scans_b0_ui = _time_b0_ui2scans_sec_f(4.00);  //Preset max time value
       _timer02=0;                                 //Preset Timer to 0
       _header_max_test_rpm_b0_si = 725;           //Preset Header target speed.
1045   _pto_cal_state_b0_ui = _pto_cal_state_DRAPER_05;  //Next State
       break;
       case _pto_cal_state_DRAPER_04:
       _low_side_for_PTO_power_relay_on;           //Turn on LSD to look for PTO switc
       if( _i_inc < current_ma_b3_si( 0.500 ) )    //Are we at the end of the binary t
1050   _pto_cal_state_b0_ui = _pto_cal_state_DRAPER_03;  //Complete for this erpm level
       else
       _pto_cal_state_b0_ui = _pto_cal_state_DRAPER_02;  //Not Complete for this erpm level
       break;
       case _pto_cal_state_DRAPER_03:
1055   _low_side_for_PTO_power_relay_on;           //Turn on LSD to look for PTO switc
       if( _throttle_setpt_rpm_b0_ui == 2100 )     //All erpm levels mapped?
       {
          *(
             (unsigned int*)
1060         (
                &ee_draper_1300_cal
                + (( _throttle_setpt_rpm_b0_ui - 1300)/100 )
             )
          )
1065   = _fwd_itest;                               //Update eeprom table
       _pto_cal_value_ma_b3_si = _fwd_itest;
       _timer02=0;
       _pto_cal_state_b0_ui = _pto_cal_state_DRAPER_07;
       }
1070   else                                        //Update displayed variable with la
                                                   //Preset Timer to 0
                                                   //Next State
```

Fig. 15

```
                                                                                              //Update eeprom table
         *( (unsigned int*)
            &ee_draper_1300_cal
            + ((_throttle_setpt_rpm_b0_ui - 1300)/100 )
         )
       = _fwd_itest;                                                                          //Update displayed variable with la
         _pto_cal_value_ma_b3_si = _fwd_itest;                                                 // Increment Engine Speed
         _throttle_set_point( _throttle_setpt_rpm_b0_ui += 100 );                              //Preset incremental current value.
         _i_inc = current_ma_b3_si( 4*2 );                                                     //Decrease test current
         _fwd_itest -= current_ma_b3_si( 2.0 );                                                //Preset max time value
         _draper_max_t_scans_b0_ui = _time_b0_ui2scans_sec_f(4.00);                            //Preset Timer to 0
         _timer02=0;                                                                           //Next State
         _pto_cal_state_b0_ui = _pto_cal_state_DRAPER_05;
       break;
       case _pto_cal_state_DRAPER_02:
         _low_side_for_PTO_power_relay_on;                                                     //Turn on LSD to look for PTO switc
         _i_inc /= 2;                                                                          //Halve the incremental current
         if( _header_test_rpm_b0_si > _header_max_test_rpm_b0_si )                             //Header Speed Low or Hi?
            _fwd_itest -= _i_inc;                                                              //Header Speed Hi...decrease curren
         else
            _fwd_itest += _i_inc;                                                              //Header Speed Lo...increase curren
         _timer02=0;                                                                           //Preset Timer to 0
         if( _draper_max_t_scans_b0_ui > _time_b0_ui2scans_sec_f(1.00) )                       //Check settling time for header to
            _draper_max_t_scans_b0_ui -= _time_b0_ui2scans_sec_f(1.00);                        //Adjust settling time
         _pto_cal_state_b0_ui = _pto_cal_state_DRAPER_05;                                      //Next State
       break;
       case _pto_cal_state_DRAPER_05:
         _low_side_for_PTO_power_relay_on;                                                     //Turn on LSD to look for PTO switc
         if( ++_timer02 >= _draper_max_t_scans_b0_ui )                                         //Dwell for settling time
         {
            _timer02=0;                                                                        //Preset Timer to 0
            _sum_header_rpm_b0_sl=0;                                                           //Preset average header speed regis
            _pto_cal_state_b0_ui = _pto_cal_state_DRAPER_06;                                   //Next State
         }
       break;
       case _pto_cal_state_DRAPER_06:
         _low_side_for_PTO_power_relay_on;                                                     //Get The Average Header Speed
         if( ++_timer02 > _time_b0_ui2scans_sec_f(1.00) )                                      //Turn on LSD to look for PTO switc
         {                                                                                    //Average over a n-sec time period
            _timer02=0;
            _header_test_rpm_b0_si =
              _sum_header_rpm_b0_sl/_time_b0_ui2scans_sec_f(1.00)                              //Preset Timer to 0
            );                                                                                 //Calc the average header speed
            _pto_cal_state_b0_ui = _pto_cal_state_DRAPER_04;
         }                                                                                     //Next state
         else
```

Fig. 16

```
             _sum_header_rpm_b0_sl += _v_pto_rpm_b0;        //Continue with average summation
        break;
1125    case _pto_cal_state_DRAPER_07:
             _low_side_for_PTO_power_relay_on;              //CALIBRATION COMPLETE...PREP FOR E
             throttle_set_point( 900 );                     //Turn on LSD to look for PTO switc
             if( ++_timer02 > _time_b0_ui2scans_sec_f(3.00) )  //Return engine speed to low idle
             (                                              //Dwell for n-sec to display last c
1130           _fwd_itest = 0;                              //Turn hydrostat drive off
               _timer02 = 0;                                //Preset Timer to 0
               _pto_cal_state_b0_ui = _PTO_CAL_STATE_SUCCESSFUL;  //Next State
             }

1135    if( _update_display_flag_b0_uc == 1 )
        (
             menu_change_focus( _pto_cal_msg, _type_menu_e );   //Pass message pointer to display handler only on first
1140         _update_display_flag_b0_uc = 0;
        }

1145    if( _pto_cal_state_b0_ui != _prev_pto_cal_state_b0_ui )
             _prev_pto_cal_state_b0_ui = _pto_cal_state_b0_ui;
             _interactive_cal_proceed_flag_b0_uc = 0;  //jpeters2004Apr201201  Default calibration proceed flag to zero _i_out_fwd_ma_b3_si = _fwd_itest;
             _i_out_rev_ma_b3_si = _rev_itest;
        // Output current passed to Icntrl Loop:
1150    Pto_Icntrl_setpt( _i_out_fwd_ma_b3_si, _i_out_rev_ma_b3_si );

Pto_Icntrl_state( CURRENT_CNTRL_state_uc Pto_ICntrl );
      }
1155  /*******************************************************************/
      void pto_calibration_proceed( void )
      {
1160       _interactive_cal_proceed_flag_b0_uc = 1;
      }
      /*******************************************************************/
      void pto_goto_calibration( void )
      {
1165       _pto_cal_state_b0_ui = _PTO_CAL_STATE_BEGIN;
           main_request_engine_running_cal();
      }
      /*******************************************************************/
1170  void pto_calibration_exit( void )
      {
           _pto_cal_state_b0_ui = _PTO_CAL_STATE_FAILED;
      }
```

*Fig. 17*

```
1175  /******************************************************/
      static void _pid(void)
      {
          static signed int    _v_error_prev_rpm_b0;
1180      signed int           _v_error_rpm_b0;
          signed int           _tmp_si;
          signed long          _tmp_sl;
          static signed int    _Kp_b12, _Ki_b12;

// #define  _Kp_b12  _gain_0.2500  _b12       // Gain at which max error generates max plant output: 0.493
1185      // #define  _Ki_b12  _gain_0.0025  _b12
          // #define  _Kd_b12  _gain_0.0000  _b12

//rstross2002Sep152011 Changing Gains...Loop Tuning!
          // #define  _Kp_b12  _gain_0.0700  _b12
1190      // #define  _Kp_b12  _gain_0.0600  _b12 if( _6_cyl_pto_disc_b_xp )
          {
1195          _Kp_b12 = gain_b12_si( 0.00800 );    //jpeters2003Jul091423 experimental gain,  lowered gain for st
              _Ki_b12 = gain_b12_si( 0.00040 );    //jpeters2003Jul091423 experimental gain,  lowered gain for st
          }
          else              //CUT_TYPE_SICKLE
          {
1200          _Kp_b12 = gain_b12_si( 0.01000 );    //jpeters2003Jul051036 Experimental gains for HW365 sickle
              _Ki_b12 = gain_b12_si( 0.00040 );    //jpeters2003Jul051024 Lowered gains for HW365 sickle
          }

//#define  _Kd_b12  gain_b12_si( 0.0300 )
1205      #define  _Kd_b12  gain_b12_si( 0.0300 )

//rstross2002Sep152011 Changing Gains...Loop Tuning!

// Calc error
1210      //rstross2002Sep152011  Header Setpoint
          //rstross2002Sep191243
          //_v_error_rpm_b0 = 2800/*_v_setpt_rpm_b0*/ - _v_pto_rpm_b0;
          _v_error_rpm_b0 = _v_setpt_rpm_b0 - _v_pto_rpm_b0;

// PID
1215      _Pcontrol_b12 = ((signed long)( _Pcontrol_b12 + ((signed long)_Kp_b12) * _v_error_rpm_b0;
          _integrator_b12 += ( ((signed long)_Ki_b12) * _v_error_rpm_b0 );
          _Icontrol_b12 = _integrator_b12;
          _Dcontrol_b12 = ((signed long)_Kd_b12) * ( _v_error_rpm_b0 - _v_error_prev_rpm_b0 );

1220      _tmp_si = ( (signed int)( ( _Pcontrol_b12 + _Icontrol_b12 + _Dcontrol_b12 + ( ((signed long)_i_offset_ma_b3_s // Clamp negative PID Values to zero
```

Fig. 18

```
1225    if( __tmp_si < 0 )
            __tmp_si = 0;

_i_out_ma_b3_si = (unsigned int)__tmp_si ;

1230    // Limit Integrator:
        // Calc max integrator value:

if( _6_cyl_pto_disc_b_xp )
            __tmp_sl = (((signed long)current_ma_b3_si( 95 ) ) * gain_b9_si( 1.0 ) );     //jpeters2003Jul011533
1235    else
            __tmp_sl = (((signed long)current_ma_b3_si( 150 )) * gain_b9_si( 1.0 ) );     //jpeters2003Jul011533

// Clamp at zero
        if( __tmp_sl < 0 )
1240        __tmp_sl = 0;
        // Clamp integrator if required
        if( _integrator_b12 > __tmp_sl )
            _integrator_b12 = __tmp_sl;

1245    // Limit current
        if( _i_out_ma_b3_si > _i_max_ma_b3_si )
            _i_out_ma_b3_si = _i_max_ma_b3_si;

//TBD - jpeters2004Aug100923 Do we need to further limit the current based on header type?
1250    if( _6_cyl_pto_disc_b_xp )
        {
            if( _i_out_ma_b3_si > current_ma_b3_si( 110 ) )
                _i_out_ma_b3_si = current_ma_b3_si( 110 );
        }
1255    else            // _ee_header_type_nb1 = sickle
        {
            if( _i_out_ma_b3_si > current_ma_b3_si( 150 ) )
                _i_out_ma_b3_si = current_ma_b3_si( 150 );
        }

1260    // Limit velocity:
        //    if( _v_pto_rpm_b0 > __v_MAX_RPM_b0 )
        //        _i_out_ma_b3_si = (_i_out_ma_b3_si * gain_b12_si( 0.95 ) ) / BIN12;

1265    // Save previous error
        _v_error_prev_rpm_b0 = __v_error_rpm_b0;

}
1270    /*******************************************************************/
        unsigned char pto_fwd_on_b_xp( void )
        {
1275        return( _pto_state == _FWD_ON || _pto_state == _VFWD );
```

Fig. 19

```
/**********************************************************/
static signed int _pto_disc_setpt_to_current_ma_b3_si(signed int _setpt_rpm_b0_si)
{
    /*
    DESCRIPTION: This function returns the predicted current necessary to operate
                 a disc header at the provided header speed with the current engine
                 speed.

I = ( Disc / 40 ) + Ioffset + ( (1.5/40)*(2150 - Eng) )
    */
    static signed int _temp, _icmd_ma_b3_si;

//  _temp = ( (signed int)( (float)(_setpt_rpm_b0_si) ) * BIN3 / 40 ) + EE_pto_fwd_offset_current_ma_b3_si );
//  _temp =
            (signed int)
            (
                _setpt_rpm_b0_si
            )
            / 5  //(*BIN3/40)
        )
        + EE_pto_fwd_offset_current_ma_b3_si
    );
    //rps2004sep151110...remove rt fp calc...Jeremy Check!!! //Calculate the nominal current needed at 2150 En
    if( engine_v_eng_rpm_b0.filtered < 2150 )
        _icmd_ma_b3_si = _temp + (signed int)( ( 2150 - (float)(engine_v_eng_rpm_b0.filtered) )*( 1.5 * BIN3 / 40
//      _icmd_ma_b3_si =
            _temp
            + (signed int)
            (
                (
                    2150
                    - (unsigned int)(engine_v_eng_rpm_b0.filtered)
                )
                * (unsigned char)(1.5 * BIN3)
            )
            / 40
        );
        //rps2004sep151110...remove rt fp calc...Jeremy Check!!!
    else
```

*Fig. 20*

```
          __icmd_ma_b3_si = __temp;

//jpeters2004Aug311216
1330      //TBD - Limit test?

return(__icmd_ma_b3_si);
      }
1335  /******************************************************/
      static signed int _pto_draper_setpt_to_current_ma_b3_si()
      (
      /*
      DESCRIPTION:
1340  */
      /*
      Damp the engine rpm input to avoid oscillations
      */
1345      __eng_rpm_b0.raw_ul = (unsigned long)engine_v_eng_rpm_b0.filtered;
          LONG_FILTER128( __eng_rpm_b0 )

return( _erpm_to_i((unsigned int)__eng_rpm_b0.filtered_ul));
1350  }
      /******************************************************/
      static unsigned int _erpm_to_i(unsigned int x)
      (
      /*
1355  Description:
          INPUT:   ERPM
          OUTPUT:  Current
      */
1360      return( UFOXW(FN1, x) );
      }
```

Fig. 21

```
1  /*
     MODULE:        Pto_Cntrl.004.c
     DESCRIPTION:   Pto Control Functions.  Possible approaches.  Use direct control via engine rpm
                    compensation. Use filter to average header speed and make minor corrections to header rpm
                    by varying gain...low band-width lead-lag loop with hard limits set for narrow-band
5                   operation.

Offset Calibration Proceedure:  Set Engine Speed to 1400rpm.  Step current
                    from 8ma to 22ma in .5ma increments.  Operator observes where header starts
10                  to rotate...depresses calibrate switch.

Span Calibration Proceedure: Set Engine Speed to 1400rpm.  Step current
                    from 41.2ma to 63.3ma in .5ma increments.  Operator observes when Header Speed reaches
15                  3200rpm...depresses calibrate switch.!

REVISION HISTORY:
        rstross2003Mar191513 Clean up of Machine Selection.  Added 5th Machine.
20      jpeters2003April1032 lowered gain to prevent oscillations in the field when hitting clumps of mud
        Pto_Cntrl.004.c - 08-Apr-2004 rfackler

*/

25  #include "alarm.h"
    #include "bin.h"
    #include "can1_RECV.h"
    #include "can1_out.h"
    #include "changes.h"
30  #include "ee_vars.h"
    #include "fox.h"
    #include "gnd_speed.h"
    #include "header.h"
    #include "hsd.h"
35  #include "iomap_appl.h"
    #include "main.h"
    #include "menu.h"
    #include "neustart.h"
    #include "Pto_Cntrl.h"
40  #include "Pto_Switch.h"
    #include "Pto_Icntrl.h"
    #include "Pto_Switch.h"
    #include "seat_switch.h"
    #include "sys_vars.h"
45  #include "throttle.h"
    #include "Timer.h"

50  /****************
        DEFINITIONS
```

*Fig. 22*

```
/****************/
// CONSTANT
#define   _v_MAX_RPM_b0    velocity_rpm_b0_ui( 3200.0 )

// ENUMERATIONS
enum _pto_states(
    _OFF,       //state 0
    _VFWD,      //state 1
    _VREV,      //state 2
    _IFWD,      //state 3
    _IREV,      //state 4
    _FWD_ON,    //state 5
    _REV_ON     //state 6
);

enum _pto_cal_states(
    _PTO_CAL_STATE_INIT,                        //state 0
    _PTO_CAL_STATE_BEGIN,                       //state 1
    _PTO_CAL_STATE_START_ENGINE,                //state 2
    _PTO_CAL_STATE_WAIT_FOR_ENG_RUNNING,        //state 3
    _PTO_CAL_STATE_CHECK_FOR_HI_IDLE,           //state 4
    _PTO_CAL_STATE_WAIT_FOR_HI_IDLE,            //state 5
    _PTO_CAL_STATE_WAIT_FOR_PTO_SWITCH,         //state 6
    _PTO_CAL_STATE_CALIBRATING,                 //state 7
    _PTO_CAL_STATE_FWD_OFFSET,                  //state 8
    _PTO_CAL_STATE_FWD_MAX,                     //state 9
    _PTO_CAL_STATE_FWD_MAX_01,                  //state 10
    _PTO_CAL_STATE_FWD_MAX_02,                  //state 11
    _PTO_CAL_STATE_FWD_MAX_03,                  //state 12
    _PTO_CAL_STATE_FWD_MAX_04,                  //state 13
    _PTO_CAL_STATE_FWD_MAX_05,                  //state 14
    _PTO_CAL_STATE_FWD_MAX_06,                  //state 15
    _PTO_CAL_STATE_FWD_MAX_07,                  //state 16
    _PTO_CAL_STATE_CHANGE_DIRECTION,            //state 17
    _PTO_CAL_STATE_REV_OFFSET,                  //state 18
    _PTO_CAL_STATE_REV_MAX,                     //state 19
    _PTO_CAL_STATE_CHECK_CONFIG,                //state 20
    _PTO_CAL_STATE_FAILED,                      //state 21
    _PTO_CAL_STATE_SUCCESSFUL,                  //state 22
    _PTO_CAL_STATE_EXIT,                        //state 23
    _PTO_CAL_STATE_ENGINE_SETTLE,               //state 24
    _pto_cal_state_DRAPER_CAL_INIT,             //state 25
    _pto_cal_state_DRAPER_02,                   //state 26
    _pto_cal_state_DRAPER_03,                   //state 27
    _pto_cal_state_DRAPER_04,                   //state 28
    _pto_cal_state_DRAPER_05,                   //state 29
    _pto_cal_state_DRAPER_06,                   //state 30
    _pto_cal_state_DRAPER_07,                   //state 31
    _PTO_CAL_STATE_SHOW_REV_MAX                 //state 32
```

105     // UNITS

/*****************
              MAPPING
110     *****************/

// REFERENCES:
            #define  _step_time       _time_b0_ui2scans_sec_f( 0.10 )
            #define  _hold_time       _time_b0_ui2scans_sec_f( 3.0 )

115     // INPUTS: DIGITAL - POSITIVE LOGIC...ON = NON-ZERO...OFF = 0.
            #define _hdr_emerg_stop_debounced   iomap_digin_swstate_S17_hdr_pto_emerg_stop.debounced

// INPUTS: ANALOG

120         #define _v_pto_rpm_b0              (Header_v_pto_rpm_b0.filtered)
            #define _v_setpt_rpm_b0             Pto_control_parameter_b0_ui
            #define _i_setpt_ma_b3_si           Pto_control_parameter_b0_ui 125     // OUTPUTS: DIGITAL - POSITIVE LOGIC...ON = NON-ZERO...OFF = 0.
            #define _low_side_for_PTO_power_relay_on   iomap_LSDout_K23_low_side_for_PTO_power=0
            #define _low_side_for_PTO_power_relay_off  iomap_LSDout_K23_low_side_for_PTO_power=1

// OUTPUTS: PWM TYPE

130     /*****************
              VARIABLES
        *****************/

135     // GLOBAL SCOPE
            signed int EE_pto_fwd_offset_current_ma_b3_si;
            signed int EE_pto_fwd_max_current_ma_b3_si;
            signed int EE_pto_rev_offset_current_ma_b3_si;
            signed int EE_pto_rev_max_current_ma_b3_si;

140     // MODULE SCOPE static unsigned char    _interactive_cal_proceed_flag_b0_uc;
145         static unsigned int     _state_prev;
            static unsigned int     _i_out_fwd_ma_b3_si;
            static unsigned int     _i_out_rev_ma_b3_si;
            static unsigned int     _i_max_ma_b3_si;
            static unsigned int     _i_offset_ma_b3_si;
150         static unsigned int     _i_calc_fwd_ma_b3_si;
            static unsigned int     _i_calc_rev_ma_b3_si;
            static signed long      _integrator_b12;
```

//jpeters2004Jun2

*Fig. 24*

```
155     static   signed int           _pto_cal_value_ma_b3_si;
        static   enum _pto_states     _pto_state;
        static   enum _pto_cal_states _pto_cal_state_b0_ui;
        static   unsigned int         _prev_pto_cal_state_b0_ui;
        static   signed long          _Pcontrol_b12, _Icontrol_b12, _Dcontrol_b12;

160     //jpeters2003Jul080752 Current step test
        static   signed int           fwd_itest, _rev_itest;
        static   unsigned int         _timer01, _timer02, _timer03;
        static   unsigned int         _prev_header_rpm_b0_si;

165     LONG_FILTER  _eng_rpm_b0;

static struct UFOX_FN FN1[] =
        (
            ( 0,    0 ),
170         ( 1300, 0 ),
            ( 1400, 0 ),
            ( 1500, 0 ),
            ( 1600, 0 ),
            ( 1700, 0 ),
175         ( 1800, 0 ),
            ( 1900, 0 ),
            ( 2000, 0 ),
            ( 2100, 0 ),
            ( 65535, 0 )
        );

180     unsigned int _throttle_setpt_rpm_b0_ui;

185     /***************
        FUNCTION PROTOTYPING - MODULE SCOPE
        ***************/
        static   void    _pto_cntrl_init( void );
190     static   void    _pto_cntrl_main( void );
        static   void    _pid( void );
        static   void    pto_calibrate( void );
        static   signed int  pto_disc_setpt_to_current_ma_b3_si( signed int );
        static   unsigned int  _erpm_to_i            (unsigned int x);
195     static   signed int   _pto_draper_setpt_to_current_ma_b3_si ( void );

/***********************************************************/
        bit pto_cntrl( const unsigned int machine_mode_b0_ui )
        {
200     //CAN_test_data[0].word = Pto_Icntrl_meas;
        //CAN_test_data[1].word = Header_v_pto_rpm_b0.filtered;
        //CAN_test_data[2].word = Pto_control_parameter_b0_ui;
        //CAN_test_data[3].word = engine_v_eng_rpm_b0.filtered;
```

Fig. 25

```
205    //CAN_test_data2[0].word = _pto_disc_setpt_to_current_ma_b3_si( _v_setpt_rpm_b0 );

//CAN_test_data2[0].word = EE_pto_fwd_offset_current_ma_b3_si;
       //CAN_test_data2[1].word = EE_pto_fwd_max_current_ma_b3_si;
210    //CAN_test_data2[2].word = EE_pto_rev_offset_current_ma_b3_si;
       //CAN_test_data2[3].word = EE_pto_rev_max_current_ma_b3_si;

215    switch( machine_mode_b0_ui )
       {
          case INIT_main_STATE_MACHINE:
          case CRITICAL_EE_VARS_OUT_OF_BOUNDS:
          case WAKEUP_TEST_OUTPUTS:
220       case WAKEUP_LIGHTS_ONLY:
          case NORMAL_ENGINE_OFF:
          case NORMAL_ENGINE_STARTING:
          case DIAG_N_SETUP_ENGINE_OFF:
          case POWER_DOWN:
225       case XCM_SETUP:
             _low_side_for_PTO_power_relay_off;          //Force LSD off as normal condition
             return(0);                                   // signify a normal return 230       case WAKEUP_APPLICATION_INIT:
             pto_cntrl_init();
             return(0);                                   // signify a normal return case NORMAL_ENGINE_RUNNING:
235          if(!in_header_remove_mode_b_xp)   //jpeters2004Jun031048 Don't operate PTO in Header Remove Mode
                _pto_cntrl_main();
             return(0);                                   // signify a normal return case CALIBRATION_ENGINE_STARTING:
240       case CALIBRATION_ENGINE_RUNNING:
             pto_calibrate();
             return(0);
       }
245    /*******************************************************************/
       bit pto_cntrl_ee_validation(void)
       {
250    /*
       This needs more work.  Need to store these as unsigned ints (with offset) and then after they are recalled
       the user module will remove the offset and use it as a signed int.  If there is a problem with any of these 4
       registers we want to change the out-of-bounds register to 0xfe00 and have this function return a value other t
       Then the main state machine should hang up in the CRITICAL_EE_VARS_OUT_OF_BOUNDS state which will force a reca
255    strategy.
```

Fig. 26.

```
        EE_pto_fwd_offset_current_ma_b3_si = (signed int)( (unsigned int)(ee_pto_fwd_offset_current_ma_b3_ui) - ( 4000
        EE_pto_fwd_max_current_ma_b3_si    = (signed int)( (unsigned int)(ee_pto_fwd_max_current_ma_b3_ui) - ( 4000 * BIN
260     EE_pto_rev_offset_current_ma_b3_si = (signed int)( (unsigned int)(ee_pto_rev_offset_current_ma_b3_ui) - ( 4000
        EE_pto_rev_max_current_ma_b3_si    = (signed int)( (unsigned int)(ee_pto_rev_max_current_ma_b3_ui) - ( 4000 * BIN
        */

// TBD APRIL 8 - THIS NEEDS TO BE FINISHED 265     if( ( EE_pto_fwd_offset_current_ma_b3_si < current_ma_b3_si )  ) || ( EE_pto_fwd_offset_current_ma_b3_si > cu
            put_ee_pto_fwd_offset_current_ma_b3_si( 5 ) );
        if( ( EE_pto_fwd_max_current_ma_b3_si < current_ma_b3_si( 26 ) ) ||( EE_pto_fwd_max_current_ma_b3_si > curr
            put_ee_pto_fwd_max_current_ma_b3_si( 50 ) );
        if( ( EE_pto_rev_offset_current_ma_b3_si < current_ma_b3_si( 103 ) ) ||( EE_pto_rev_offset_current_ma_b3_si > cu
            put_ee_pto_rev_offset_current_ma_b3_si( 5 ) );
270     if( ( EE_pto_rev_max_current_ma_b3_si < current_ma_b3_si( 31 ) ) );
            put_ee_pto_rev_max_current_ma_b3_si( 10 ) ); ||( EE_pto_rev_max_current_ma_b3_si > current
            put_ee_pto_rev_max_current_ma_b3_si( 69 ) );

#define __ee_draper_val( __var, __i_def )    if( ( __var < current_ma_b3_ui( __i_def-15.0 ) ) || ( __var > cur
275                                                       __var = current_ma_b3_ui( __i_def )

__ee_draper_val( ee_draper_1300_cal,  61.0 );
            __ee_draper_val( ee_draper_1400_cal,  57.0 );
            __ee_draper_val( ee_draper_1500_cal,  56.0 );
            __ee_draper_val( ee_draper_1600_cal,  54.0 );
280         __ee_draper_val( ee_draper_1700_cal,  52.0 );
            __ee_draper_val( ee_draper_1800_cal,  50.0 );
            __ee_draper_val( ee_draper_1900_cal,  48.0 );
            __ee_draper_val( ee_draper_2000_cal,  47.0 );
            __ee_draper_val( ee_draper_2100_cal,  45.0 );

285     #undef __ee_draper_val return(0);      // do this for now
290     }

/***********************************************************************/
        void put_ee_pto_fwd_offset_current_ma_b3_si( signed int __X )
        {
295         EE_pto_fwd_offset_current_ma_b3_si = __X;
            ee_pto_fwd_offset_current_ma_b3_ui = (unsigned int)( __X + ( 4000 * BIN3 ) );
        }
        /***********************************************************************/
300     void put_ee_pto_fwd_max_current_ma_b3_si( signed int __X )
        {
            EE_pto_fwd_max_current_ma_b3_si = __X;
            ee_pto_fwd_max_current_ma_b3_ui = (unsigned int)( __X + ( 4000 * BIN3 ) );
        }
305     /***********************************************************************/
```

Fig. 27

```
      void put_ee_pto_rev_offset_current_ma_b3_si( signed int __X )
      {
310     EE_pto_rev_offset_current_ma_b3_si = __X;
        ee_pto_rev_offset_current_ma_b3_ui = (unsigned int)( __X + ( 4000 * BIN3 ) );
      }
      /**********************************************************/
      void put_ee_pto_rev_max_current_ma_b3_si( signed int __X )
315   {
        EE_pto_rev_max_current_ma_b3_si = __X;
        ee_pto_rev_max_current_ma_b3_ui = (unsigned int)( __X + ( 4000 * BIN3 ) );
      }
      /**********************************************************/
320   static void  _pto_cntrl_init( void )
      {
325     _fwd_itest = 0;
        _timer01 = _timer02 = _timer03 = 0;
        _pto_state = _state_prev = _OFF;

FN1[0].y =   ee_draper_1300_cal;
        FN1[1].y =   ee_draper_1300_cal;
330     FN1[2].y =   ee_draper_1400_cal;
        FN1[3].y =   ee_draper_1500_cal;
        FN1[4].y =   ee_draper_1600_cal;
        FN1[5].y =   ee_draper_1700_cal;
        FN1[6].y =   ee_draper_1800_cal;
335     FN1[7].y =   ee_draper_1900_cal;
        FN1[8].y =   ee_draper_2000_cal;
        FN1[9].y =   ee_draper_2100_cal;
        FN1[10].y =  ee_draper_2100_cal;

340   #ifdef DATA_ACQ_GET_DRAPER_CAL  //rps2004nov101028
        CAN_test_data[0].word = ee_draper_1300_cal;;
        CAN_test_data[1].word = ee_draper_2100_cal;
345   #endif
      }
      /**********************************************************/
350   static void _pto_cntrl_main(void)
      {
        static unsigned char __pto_fwd_state_b0_uc;

355   #define    _pto_fwd_state_init      0
      #define    _pto_fwd_state_iramp     1
```

Fig. 28

```
       #define    _pto_fwd_state_hold    2
       #define    _pto_fwd_state_pid     3

_pto_state = Pto_control_state_b0_uc;

360    // Output current defaulted to 0 ma:
       _i_out_fwd_ma_b3_si = _i_out_rev_ma_b3_si = 0;

365    // State Machine
       if( _pto_state != _state_prev)
       {
           //jpeters2004Aug101454 correcting disc overshoot at step response
370        if( _6_cyl_pto_sickle_b_xp && ( _pto_state == _VFWD) )
           {
               _integrator_b12 = BIN9*((unsigned long)current_ma_b3_si( 100 ) );    //sickle must be pre-charged
           }
375        else
           {
               _integrator_b12 = 0;
           }

_pto_fwd_state_b0_uc = _pto_fwd_state_init;
380        if( _pto_state == PTO_STATE_VELOCITY_FWD_ENGINE_COMP )
           {
               _eng_rpm_b0.raw_ul = 2150;
385            LONG_FILTER128_INIT( _eng_rpm_b0 );
           }
       } switch( _pto_state )
       {
390        default:
           case _OFF:
               _pto_fwd_state_b0_uc = _pto_fwd_state_init;
               Pto_Icntrl_state(OFF_state_uc_Pto_ICntrl);
               break;

395        case _VFWD:
               Pto_Icntrl_state(CURRENT_CNTRL_state_uc_Pto_ICntrl);

//jpeters2004Aug121830 Added ramp start before PID loop to avoid overshoot
400            switch( _pto_fwd_state_b0_uc )
               {
                   case _pto_fwd_state_init:
                       _i_out_ma_b3_si = EE_pto_fwd_offset_current_ma_b3_si;
                       _pto_fwd_state_b0_uc = _pto_fwd_state_iramp;
                       break;
405                case _pto_fwd_state_iramp:
                       if( _i_out_ma_b3_si < EE_pto_fwd_offset_current_ma_b3_si )    //Start the PTO with a slow current
                           _i_out_ma_b3_si = EE_pto_fwd_offset_current_ma_b3_si;     //Start the ramp at the offset current
```

*Fig. 29*

```
410     if( _i_out_ma_b3_si < EE_pto_fwd_max_current_ma_b3_si && ++_timer01 > _step_time )
        {
            _timer01=0;
415         _i_out_ma_b3_si += current_ma_b3_si( 1 );
        }
        if(
            ( ((signed int)_v_setpt_rpm_b0 - (signed int)_v_pto_rpm_b0) < (signed int)100 )   //Once the
            || ( _6_cyl_pto_disc_b_xp && ( _i_out_ma_b3_si >= _pto_disc_setpt_to_current_ma_b3_si( _v_setpt
        )
420     {
            _timer01=0;                             //TBD- Add a timeout here?
            _pto_fwd_state_b0_uc = _pto_fwd_state_hold;
        )
        _i_out_fwd_ma_b3_si = _i_out_ma_b3_si;
425     break;
        case _pto_fwd_state_hold:
            //if( ++_timer01 > _hold_time )
        (
            _timer01=0;
430         _integrator_b12 = ( ((signed long)( _i_out_ma_b3_si) * BIN9 ) - ( ((signed long)EE_pto_fwd_offs
            _pto_fwd_state_b0_uc = _pto_fwd_state_pid;
        )
        _i_out_fwd_ma_b3_si = _i_out_ma_b3_si;
435     break;
        case _pto_fwd_state_pid:
            _i_max_ma_b3_si = EE_pto_fwd_max_current_ma_b3_si;
440         _i_offset_ma_b3_si = EE_pto_fwd_offset_current_ma_b3_si;
            _pid();
            _i_out_fwd_ma_b3_si = _i_out_ma_b3_si;
        break;
445     case _VREV:
            Pto_Icntrl_state(CURRENT_CNTRL_state_uc_Pto_ICntrl);
            _i_max_ma_b3_si = EE_pto_rev_max_current_ma_b3_si;
            _i_offset_ma_b3_si = EE_pto_rev_offset_current_ma_b3_si;
450         _i_out_rev_ma_b3_si = _i_out_ma_b3_si;
        break;
        case _IFWD:
            Pto_Icntrl_state(CURRENT_CNTRL_state_uc_Pto_ICntrl);
            //_i_out_fwd_ma_b3_si = _pto_disc_setpt_to_current_ma_b3_si( _v_setpt_rpm_b0 );
455         _i_out_fwd_ma_b3_si = _i_setpt_ma_b3_si;
            //_i_out_fwd_ma_b3_si = current_ma_b3_si( 50 );
        break;
```

*Fig. 30*

```
460         case _IREV:
                Pto_Icntrl_state(CURRENT_CNTRL__state_uc_Pto_ICntrl);
                _i_out_rev_ma_b3_si = _i_setpt_ma_b3_si;
                break;

465         case _FWD_ON:
                Pto_Icntrl_state(FWD_ON__state_uc_Pto_ICntrl);
                break;

470         case _REV_ON:
                Pto_Icntrl_state(REV_ON__state_uc_Pto_ICntrl);
                break;

case PTO_STATE_VELOCITY_FWD_ENGINE_COMP:
475             Pto_Icntrl_state(CURRENT_CNTRL__state_uc_Pto_ICntrl);
                _i_out_fwd_ma_b3_si = _pto_draper_setpt_to_current_ma_b3_si();
                break;
        )

480     _state_prev = _pto_state;

// Output current passed to Icntrl Loop:
        Pto_Icntrl_setpt(_i_out_fwd_ma_b3_si, _i_out_rev_ma_b3_si);
485 )

/************************************************************/
unsigned char pto_state_is_off_b_xp( void )
(
/*
490 Description:
*/
    if( _pto_state == _OFF )
        return(1);
    else
495     return(0);
)

/************************************************************/
int* pto_get_state_pi( void )
500 {
/*
Description:
*/
    static int _x;
505     _x=_pto_cal_state_b0_ui;
    return(&_x);
)

/************************************************************/
510 int* pto_get_cal_value_pi( void )
```

*Fig. 31*

```
    /*
    Description:
    */
515    static int __x;
    #ifdef ENGINEERING_TEST //rps2004oct261639
        __x=(((_pto_cal_value_ma_b3_si )*10)/BIN3);
    #else
        __x=( _pto_cal_value_ma_b3_si )/BIN3;
520 #endif
        return(&__x);
    }
    /****************************************************************/
525 static void pto_calibrate(void)
    {
        static unsigned char  __update_display_flag_b0_uc;
        static const void*    __pto_cal_msg;
530     static signed int     __i_inc;
        static signed long    __sum_header_rpm_b0_sl;
        static signed int     __header_max_test_rpm_b0_si;
        static signed int     __header_test_rpm_b0_si;
        static signed int     __draper_max_t_scans_b0_ui;

535 #define  __itest_max      current_ma_b3_si( 170 )
    #define  __initwait       __time_b0_ui2scans_sec_f( 3 )
    #define  __calwait        __time_b0_ui2scans_sec_f( 3.0 )
    #define  __cal_step       __time_b0_ui2scans_sec_f( 1.0 )

540     switch( _pto_cal_state_b0_ui )
        {
        case _PTO_CAL_STATE_INIT:           //Wait here until PTO Calibration is requested
545         _fwd_itest = _rev_itest = _timer01 = _timer02 = _timer03 = _pto_cal_value_ma_b3_si = 0;
            return;

case _PTO_CAL_STATE_BEGIN:
            _fwd_itest = _rev_itest;
550         //Display a message here warning the operator before proceeding with cal that PTO will turn.
            //Operator can also choose exit to stop the calibration
            _pto_cal_msg = _pto_cal_running_menu;
            if ( ++_timer02 > _initwait )
            {
555             _timer02=0;
                _pto_cal_msg = _cal_start_eng_menu;
                _pto_cal_state_b0_ui = _PTO_CAL_STATE_START_ENGINE;
            }
            if( _4_cylinder_b_xp )    //TBD - jpeters2004Jun021332 Change cal menu to only display pto Cal for 6D m
560         {
                _pto_cal_state_b0_ui = _PTO_CAL_STATE_CHECK_CONFIG;
```

Fig. 32

```
         _timer02=0;
       )
       break;
565    case _PTO_CAL_STATE_START_ENGINE:
       if( !NeuStart_status_bt_xp() )
       {
         menu_change_focus( _cal_start_eng_menu, _type_menu_e );
570      _pto_cal_state_b0_ui = _PTO_CAL_STATE_WAIT_FOR_ENG_RUNNING;
       }
       else
       {
         menu_change_focus( get_neustart_message(), _type_menu );
575    }
       break;
       case _PTO_CAL_STATE_WAIT_FOR_ENG_RUNNING:
       if ( !NeuStart_status_bt_xp() )
580      _pto_cal_state_b0_ui = _PTO_CAL_STATE_START_ENGINE;
       if( engine_running_b_xp )
       {
         _timer02 = 0;
585      _pto_cal_state_b0_ui = _PTO_CAL_STATE_CHECK_FOR_HI_IDLE;
       }
       break;
       case _PTO_CAL_STATE_CHECK_FOR_HI_IDLE:
       throttle_set_point( 1300 );              //Set Engine Speed to 1300 rpm
590    if( ++_timer02 >= 200 )                  //Delay (2) Seconds to allow Engine to settle
       {
         _timer02 = 0;
         _pto_cal_state_b0_ui = _PTO_CAL_STATE_WAIT_FOR_PTO_SWITCH;
       }
595    break;
       case _PTO_CAL_STATE_WAIT_FOR_PTO_SWITCH:
       _low_side_for_PTO_power_relay_on;        //turn on LSD to look for PTO switch
       _pto_cal_msg = _pto_cal_wait_menu;
600    if( _hdr_emerg_stop_debounced )
       {
         _pto_cal_state_b0_ui = _PTO_CAL_STATE_CALIBRATING;
       }
       break;
605    case _PTO_CAL_STATE_CALIBRATING:
       _low_side_for_PTO_power_relay_on;        //turn on LSD to look for PTO switch
       _pto_cal_msg = _pto_cal_start_warning_menu;
       // TBD  Display some sort of message here warning the operator of the calibration mode.  PTO may begin
610    if( ++_timer02 > _calwait )
       {
         _timer02=0;
```

*Fig. 33*

```
615         if( _6_cyl_pto_draper_b_xp )
                _pto_cal_state_b0_ui = _pto_cal_state_DRAPER_CAL_INIT;
            else
                _pto_cal_state_b0_ui = _PTO_CAL_STATE_FWD_OFFSET;    //Disc or Sickle Header PTO Calibration
            )

//TBD - jpeters2004Jun101332 should seat switch state machine run in calibration mode?
620         if( !_hdr_emerg_stop_debounced || !seat_switch_bt_xp )
            {
                _timer02=0;
                _pto_cal_state_b0_ui = _PTO_CAL_STATE_FAILED;
            }
625         break;

case _PTO_CAL_STATE_FWD_OFFSET:
            _low_side_for_PTO_power_relay_on;               //turn on LSD to look for PTO switch
630         _pto_cal_msg = _pto_cal_running_menu;
            _rev_itest=0;
            if(_fwd_itest <= _itest_max)
            {
635             if( ++_timer02 > 20 )
                {
                    _timer02=0;
                    _fwd_itest += current_ma_b3_si( 1 );
                }
                if( ( _v_pto_rpm_b0 > 1 ) || _interactive_cal_proceed_flag_b0_uc )
                {
640                 _timer02=0;
                    put_ee_pto_fwd_offset_current_ma_b3_si( _fwd_itest );
                    _pto_cal_value_ma_b3_si = EE_pto_fwd_offset_current_ma_b3_si;
                    _pto_cal_state_b0_ui = _PTO_CAL_STATE_FWD_MAX;
                }
645         }
            else
            {
                _timer02=0;
                _fwd_itest = 0;
                _pto_state = _OFF;
650             _pto_cal_state_b0_ui = _PTO_CAL_STATE_FAILED;         //If over max current reset everything
            }
            if(
                !_hdr_emerg_stop_debounced
655             || !seat_switch_bt_xp )
            {
                _timer02=0;
                _pto_cal_state_b0_ui = _PTO_CAL_STATE_FAILED;
            }
660         break;

case _PTO_CAL_STATE_FWD_MAX:
```

Fig. 34

```
665         _low_side_for_PTO_power_relay_on;              //turn on LSD to look for PTO switch
            if( _6_cyl_pto_sickle_b_xp)
              _fwd_itest = current_ma_b3_si( 75 );
            else
              _fwd_itest = current_ma_b3_si( 135 );

670         _timer02=0;
            _pto_cal_state_b0_ui = _PTO_CAL_STATE_FWD_MAX_02;
          break;
          case _PTO_CAL_STATE_FWD_MAX_02:
            _low_side_for_PTO_power_relay_on;              //turn on LSD to look for PTO switch
675         if( ++_timer02 >= _time_b0_ui2scans_sec_f(5.00) )
            {
              _timer02=0;
              _sum_header_rpm_b0_sl=0;
              _pto_cal_state_b0_ui = _PTO_CAL_STATE_FWD_MAX_03;
680         }
          break;
          case _PTO_CAL_STATE_FWD_MAX_03:
            _low_side_for_PTO_power_relay_on;              //turn on LSD to look for PTO switch
685         if( ++_timer02 > _time_b0_ui2scans_sec_f(1.00) )
            {
              _timer02=0;
              if(_6_cyl_pto_sickle_b_xp)
              {
690             _header_max_test_rpm_b0_si = (signed int)(1750 / 2.5);
                _i_inc = current_ma_b3_si( 8*2 );
                _fwd_itest = current_ma_b3_si( 75 );
              }
              else
              {
695             _header_max_test_rpm_b0_si = (signed int)((_sum_header_rpm_b0_sl/_time_b0_ui2scans_sec_f(1.00))-25
                _i_inc = current_ma_b3_si( 16*2 );
                _fwd_itest = current_ma_b3_si( 103 );
              }
              _timer02=0;
700           _pto_cal_state_b0_ui = _PTO_CAL_STATE_FWD_MAX_05;
            }
            else
              _sum_header_rpm_b0_sl += _v_pto_rpm_b0;
          break;
          case _PTO_CAL_STATE_FWD_MAX_04:
705         _low_side_for_PTO_power_relay_on;              //turn on LSD to look for PTO switch if( _header_test_rpm_b0_si > _header_max_test_rpm_b0_si )
              _fwd_itest -= _i_inc;
            else
710           _fwd_itest += _i_inc;

if( _i_inc < current_ma_b3_si( 0.500 ) )
```

*Fig. 35*

```
715         else
            {
              _pto_cal_state_b0_ui = _PTO_CAL_STATE_FWD_MAX_07;   //Forward Max Finished
              _timer02=0;
              _pto_cal_state_b0_ui = _PTO_CAL_STATE_FWD_MAX_05;
            }
720     break;
        case _PTO_CAL_STATE_FWD_MAX_05:
            _low_side_for_PTO_power_relay_on;                    //turn on LSD to look for PTO switch
            if( ++_timer02 >= _time_b0_ui2scans_sec_f(5.00) )
            {
725           _timer02=0;
              sum_header_rpm_b0_sl=0;
              _pto_cal_state_b0_ui = _PTO_CAL_STATE_FWD_MAX_06;
            }
        break;
730     case _PTO_CAL_STATE_FWD_MAX_06:
            _low_side_for_PTO_power_relay_on;                    //turn on LSD to look for PTO switch
            if( ++_timer02 > _time_b0_ui2scans_sec_f(1.00) )
            {
              _timer02=0;
735           header_test_rpm_b0_sl = sum_header_rpm_b0_sl/_time_b0_ui2scans_sec_f(1.00);
              _pto_cal_state_b0_ui = _PTO_CAL_STATE_FWD_MAX_04;
            }
            else
              sum_header_rpm_b0_sl += _v_pto_rpm_b0;
740     break;
        case _PTO_CAL_STATE_FWD_MAX_07:
            _low_side_for_PTO_power_relay_on;                    //turn on LSD to look for PTO switch
            put_ee_pto_fwd_max_current_ma_b3_si( _fwd_itest );
            pto_cal_value_ma_b3_si = EE_pto_fwd_max_current_ma_b3_si;
745         _fwd_itest=0;
            _timer02 = 0;
            _pto_cal_state_b0_ui = _PTO_CAL_STATE_CHANGE_DIRECTION;
            if(  !_hdr_emerg_stop_debounced
750             || !seat_switch_bt_xp )
            {
              _timer02=0;
              _pto_cal_state_b0_ui = _PTO_CAL_STATE_FAILED;
            }
755     break;
        case _PTO_CAL_STATE_CHANGE_DIRECTION:                    //turn on LSD to look for PTO switch
            _low_side_for_PTO_power_relay_on;
            _fwd_itest = _rev_itest = _i_out_fwd_ma_b3_si = _i_out_rev_ma_b3_si = 0;    //Make sure it stops
            //if( _v_pto_rpm_b0 < 2)
760         if( (++_timer02 > _calwait) && (_v_pto_rpm_b0 < 2) )    //Wait at least 3sec, more if pto not stopped
            {
              _timer02=0;
765
```

*Fig. 36*

```
        _pto_cal_state_b0_ui = _PTO_CAL_STATE_REV_OFFSET;
      }
      if(
770      !_hdr_emerg_stop_debounced
         || !seat_switch_bt_xp )
      {
        _timer02=0;
        _pto_cal_state_b0_ui = _PTO_CAL_STATE_FAILED;
      }
775   break;

case _PTO_CAL_STATE_REV_OFFSET:                    //Calibrate the Reverse coil just the same as the
        _low_side_for_PTO_power_relay_on;                //turn on LSD to look for PTO switch
        _fwd_itest=0;
780   //TBD - Get rid of disc specific values
        if
        (
           !(_6_cyl_pto_sickle_b_xp) && (_rev_itest <= _itest_max) && (_v_pto_rpm_b0 < 1000)
           || (_6_cyl_pto_sickle_b_xp) && (_rev_itest <= _itest_max) && (_v_pto_rpm_b0 < (unsigned int)(250/2.5)
        )
785   if( ++_timer02 > _cal_step )
      {
        _timer02=0;
790     if( _6_cyl_pto_sickle_b_xp )
           _rev_itest += current_ma_b3_si( 1 );
        else
           _rev_itest += current_ma_b3_si( 5 );
      }
795   if( ( _v_pto_rpm_b0 > 1 ) || _interactive_cal_proceed_flag_b0_uc )
      {
        _timer02=0;
        put_ee_pto_rev_offset_current_ma_b3_si( _rev_itest );
800     pto_cal_value_ma_b3_si = EE_pto_rev_offset_current_ma_b3_si;
        _pto_cal_state_b0_ui = _PTO_CAL_STATE_REV_MAX;
      }
      else
      {
805     _timer02=0;
        _rev_itest = 0;
        _pto_state = _OFF;
        _pto_cal_state_b0_ui = _PTO_CAL_STATE_FAILED;          //If over max current reset everything and end cal
      }
810   if(
          !_hdr_emerg_stop_debounced
          || !seat_switch_bt_xp )
      {
        _timer02=0;
815     _pto_cal_state_b0_ui = _PTO_CAL_STATE_FAILED;
```

Fig. 37

```
        )
        break;
820  case _PTO_CAL_STATE_REV_MAX:
        _low_side_for_PTO_power_relay_on;      //turn on LSD to look for PTO switch
        _fwd_itest=0;
        //TBD - Get rid of disc specific values
825     if(
            !(_6_cyl_pto_sickle_b_xp) && (_rev_itest <= _itest_max) && (_v_pto_rpm_b0 < 1500)
         || (_6_cyl_pto_sickle_b_xp) && (_rev_itest <= _itest_max) && (_v_pto_rpm_b0 < (unsigned int)(500)  )
        )
830     if( ++_timer02 > _cal_step )
        {
            _timer02=0;
835         _rev_itest += current_ma_b3_si( 1 );
        }
        //TBD - Base cal point on steady state velocity, so it is universal across header types
        if(_interactive_cal_proceed_flag_b0_uc
         ||( (_6_cyl_pto_disc_b_xp) && ( _v_pto_rpm_b0 >= velocity_rpm_b0_si(1000) ) )   //Take reverse secon
         ||( (_6_cyl_pto_sickle_b_xp) && ( _v_pto_rpm_b0 >= velocity_rpm_b0_si((unsigned int)(300)) ) ) )
        {
840         put_ee_pto_rev_max_current_ma_b3_si( _rev_itest );
            _pto_cal_value_ma_b3_si = EE_pto_rev_max_current_ma_b3_si;
            _timer02 = 0;
            _pto_cal_state_b0_ui = _PTO_CAL_STATE_SHOW_REV_MAX;
        }
845     else
        {
            _timer02=0;
850         _rev_itest = 0;
            _pto_state = _OFF;
            _pto_cal_state_b0_ui = _PTO_CAL_STATE_FAILED;         //If over max current reset everything and end cal
        }
855     if( !_hdr_emerg_stop_debounced
         || !seat_switch_bt_xp )
        {
            _timer02=0;
            _pto_cal_state_b0_ui = _PTO_CAL_STATE_FAILED;
        }
860     break;
     case _PTO_CAL_STATE_SHOW_REV_MAX:
        if( ++_timer02 >= 300   )
        {
865         _timer02 = 0;
            _pto_cal_state_b0_ui = _PTO_CAL_STATE_SUCCESSFUL;
        }
```

Fig. 38

```
        break;

870  case _PTO_CAL_STATE_CHECK_CONFIG:
       //_low_side_for_PTO_power_relay_off;       //turn off LSD to unlatch PTO switch
       _rev_itest = _fwd_itest = _i_out_rev_ma_b3_si = _i_out_fwd_ma_b3_si = 0;
       _pto_state = _OFF;
875    _pto_cal_msg = _cal_check_config_menu;
       if(++_timer02 > _calwait )
       {
         _timer02=0;
         _pto_cal_state_b0_ui = _PTO_CAL_STATE_EXIT;
       }
880  break;

case _PTO_CAL_STATE_FAILED:
       //_low_side_for_PTO_power_relay_off;       //turn off LSD to unlatch PTO switch
       //indicate cal failure with beep
885    Alarm_OneShot_1sec();
       _rev_itest = _fwd_itest = _i_out_rev_ma_b3_si = _i_out_fwd_ma_b3_si = 0;
       _pto_state = _OFF;
       _pto_cal_msg = _cal_failed_menu;
       if(++_timer02 > _calwait )
890    {
         _timer02=0;
         _pto_cal_state_b0_ui = _PTO_CAL_STATE_EXIT;
       }
895  break;

case _PTO_CAL_STATE_SUCCESSFUL:
       //_low_side_for_PTO_power_relay_off;       //turn off LSD to unlatch PTO switch
       _rev_itest = _fwd_itest = _i_out_rev_ma_b3_si = _i_out_fwd_ma_b3_si = 0;
900    _pto_state = _OFF;
       _pto_cal_msg = _cal_success_menu;
       if(++_timer02 > _calwait)
       {
         _timer02=0;
905      _pto_cal_state_b0_ui = _PTO_CAL_STATE_EXIT;
       }
     break;

case _PTO_CAL_STATE_EXIT:
       //_low_side_for_PTO_power_relay_off;       //turn off LSD to unlatch PTO switch
910    _pto_cal_msg = _cal_ended_key_off;
       _rev_itest = _fwd_itest = _i_out_rev_ma_b3_si = _i_out_fwd_ma_b3_si = 0;
       _pto_state = _OFF;
       if(++_timer02 > _calwait)
       {
915      _timer02=0;
         //menu_change_focus(_calibrations_menu);
         //_pto_cal_state_b0_ui = _PTO_CAL_STATE_INIT;
       }
```

Fig. 39

```
       break;
920    case _pto_cal_state_DRAPER_CAL_INIT:
          _low_side_for_PTO_power_relay_on;                              //Turn on LSD to look for PTO switc
          _pto_cal_msg = _pto_cal_running_menu;                          //Show Calibration Message on Displ
          throttle_set_point( _throttle_setpt_rpm_b0_ui = 1300 );        //Increment Engine Speed
925       _i_inc = current_ma_b3_si( 8*2 );                              //Preset incremental current value.
          _fwd_itest = current_ma_b3_si( 63 );                           //Preset test current value to nom
          _draper_max_t_scans_b0_ui = _time_b0_ui2scans_sec_f(4.00);     //Preset max time value
          _timer02=0;                                                    //Preset Timer to 0
          _header_max_test_rpm_b0_si = 725;                              //Preset Header target speed.
930       _pto_cal_state_b0_ui = _pto_cal_state_DRAPER_05;               //Next State
       break;
       case _pto_cal_state_DRAPER_04:
          _low_side_for_PTO_power_relay_on;                              //Turn on LSD to look for PTO switc
          if( _i_inc < current_ma_b3_si( 0.500 ) )                       //Are we at the end of the binary t
935          _pto_cal_state_b0_ui = _pto_cal_state_DRAPER_03;            //Complete for this erpm level
          else
             _pto_cal_state_b0_ui = _pto_cal_state_DRAPER_02;            //Not Complete for this erpm level
       break;
       case _pto_cal_state_DRAPER_03:
          _low_side_for_PTO_power_relay_on;                              //Turn on LSD to look for PTO switc
940       if( _throttle_setpt_rpm_b0_ui == 2100 )                        //All erpm levels mapped?
          (
             *(
                (unsigned int*)
945             &ee_draper_1300_cal
                + (( _throttle_setpt_rpm_b0_ui - 1300)/100 )
             )
             = _fwd_itest;                                               //Update eeprom table
950          _pto_cal_value_ma_b3_si = _fwd_itest;
             _timer02=0;                                                 //Preset Timer to 0
             _pto_cal_state_b0_ui = _pto_cal_state_DRAPER_07;            //Next State
          )
          else
955       (
             *(
                (unsigned int*)
                &ee_draper_1300_cal
960             + (( _throttle_setpt_rpm_b0_ui - 1300)/100 )
             )
             = _fwd_itest;                                               //Update eeprom table
             _pto_cal_value_ma_b3_si = _fwd_itest;
             throttle_set_point( _throttle_setpt_rpm_b0_ui += 100 );     //Update displayed variable with la
             _i_inc = current_ma_b3_si( 4*2 );                           //Increment Engine Speed
965          _fwd_itest -= current_ma_b3_si( 2.0 );                      //Preset incremental current value.
             _draper_max_t_scans_b0_ui = _time_b0_ui2scans_sec_f(4.00);  //Decrease test current
                                                                         //Preset max time value
```

Fig. 40

```
970                 _timer02=0;                                                              //Preset Timer to 0
                    _pto_cal_state_b0_ui = _pto_cal_state_DRAPER_05;                         //Next State
                    break;
975         case _pto_cal_state_DRAPER_02:
                    _low_side_for_PTO_power_relay_on;                                        //Turn on LSD to look for PTO switc
                    _i_inc /= 2;                                                             //Halve the incremental current
                    if( _header_test_rpm_b0_si > _header_max_test_rpm_b0_si )                //Header Speed Low or Hi?
                        _fwd_itest -= _i_inc;                                                //Header Speed Hi...decrease curren
                    else
980                     _fwd_itest += _i_inc;                                                //Header Speed Lo...increase curren
                    _timer02=0;                                                              //Preset Timer to 0
                    if( _draper_max_t_scans_b0_ui > _time_b0_ui2scans_sec_f(1.00) )          //Check settling time for header to
                        _draper_max_t_scans_b0_ui -= _time_b0_ui2scans_sec_f(1.00);          //Adjust settling time
                    _pto_cal_state_b0_ui = _pto_cal_state_DRAPER_05;                         //Next State
985         break;
            case _pto_cal_state_DRAPER_05:
                    _low_side_for_PTO_power_relay_on;                                        //Turn on LSD to look for PTO switc
                    if( ++_timer02 >= _draper_max_t_scans_b0_ui )                            //Dwell for settling time
                    (
990                     _timer02=0;                                                          //Preset Timer to 0
                        _sum_header_rpm_b0_sl=0;                                             //Preset average header speed regis
                        _pto_cal_state_b0_ui = _pto_cal_state_DRAPER_06;                     //Next State
                    )
            break;
995         case _pto_cal_state_DRAPER_06:
                    _low_side_for_PTO_power_relay_on;                                        //Turn on LSD to look for PTO switc
                    if( ++_timer02 > _time_b0_ui2scans_sec_f(1.00) )                         //Average over a n-sec time period
                    (
                        _timer02=0;                                                          //Preset Timer to 0
1000                    _header_test_rpm_b0_si =                                             //Calc the average header speed
                        _sum_header_rpm_b0_sl/_time_b0_ui2scans_sec_f(1.00)
                        );
                        _pto_cal_state_b0_ui = _pto_cal_state_DRAPER_04;                     //Next state
                    )
1005            else
                    _sum_header_rpm_b0_sl += _v_pto_rpm_b0;                                  //Continue with average summation
            break;
            case _pto_cal_state_DRAPER_07:
1010                _low_side_for_PTO_power_relay_on;                                        //CALIBRATION COMPLETE...PREP FOR E
                    throttle_set_point( 900 );                                               //Turn on LSD to look for PTO switc
                    if( ++_timer02 > _time_b0_ui2scans_sec_f(3.00) )                         //Return engine speed to low idle
                    (                                                                        //Dwell for n-sec to display last c
                        _fwd_itest = 0;
1015                    _timer02 = 0;                                                        //Turn hydrostat drive off
                        _pto_cal_state_b0_ui = _PTO_CAL_STATE_SUCCESSFUL;                    //Preset Timer to 0
                    )                                                                        //Next State
                )
1020        if( __update_display_flag_b0_uc == 1 )
```

*Fig. 41*

```
            menu_change_focus( _pto_cal_msg, _type_menu_e );   //Pass message pointer to display handler only on first
            _update_display_flag_b0_uc = 0;
        }
1025    if( _pto_cal_state_b0_ui != _prev_pto_cal_state_b0_ui )
            _update_display_flag_b0_uc = 1;

_prev_pto_cal_state_b0_ui = _pto_cal_state_b0_ui;
1030    _interactive_cal_proceed_flag_b0_uc = 0;   //jpeters2004Apr201201  Default calibration proceed flag to zero _i_out_fwd_ma_b3_si = _fwd_itest;
        _i_out_rev_ma_b3_si = _rev_itest;
        // Output current passed to Icntrl Loop:
1035    Pto_Icntrl_septt( _i_out_fwd_ma_b3_si, _i_out_rev_ma_b3_si );

Pto_Icntrl_state( CURRENT_CNTRL_state_uc_Pto_ICntrl );
    }
1040 /*****************************************************************/
    void pto_calibration_proceed( void )
    {
        _interactive_cal_proceed_flag_b0_uc = 1;
1045 }
    /*****************************************************************/
    void pto_goto_calibration( void )
    {
        _pto_cal_state_b0_ui = _PTO_CAL_STATE_BEGIN;
1050    main_request_engine_running_cal();
    }
    /*****************************************************************/
    void pto_calibration_exit( void )
    {
1055    _pto_cal_state_b0_ui = _PTO_CAL_STATE_FAILED;
    }
    /*****************************************************************/
1060 static void _pid(void)
    {
        static signed int   v_error_prev_rpm_b0;
        signed int          v_error_rpm_b0;
        signed int          _tmp_si;
1065    signed long         _tmp_sl;
        static signed int   Kp_b12, _Ki_b12;

//  #define _Kp_b12  _gain 0.2500  _b12
    //  #define _Ki_b12  _gain 0.0025  _b12
1070 // #define _Kd_b12  _gain 0.0000  _b12      // Gain at which max error generates max plant output: 0.493
```

*Fig. 42*

```
       //rstross2002sep152011 Changing Gains...Loop Tuning!
       // #define  __Kp_b12  __gain 0.0700  _b12
       // #define  __Kp_b12  __gain 0.0600  _b12

1075   if( _6_cyl_pto_disc_b_xp )
       {
          __Kp_b12 = gain_b12_si( 0.00800 );    //jpeters2003Jul091423 experimental gain,  lowered gain for st
          __Ki_b12 = gain_b12_si( 0.00040 );    //jpeters2003Jul091423 experimental gain,  lowered gain for st
1080   }
       else     //CUT_TYPE_SICKLE
       {
          __Kp_b12 = gain_b12_si( 0.01000 );    //jpeters2003Jul051036 Experimental gains for HW365 sickle
          __Ki_b12 = gain_b12_si( 0.00040 );    //jpeters2003Jul051024 Lowered gains for HW365 sickle
1085   }

//#define  __Kd_b12   __gain 0.0300   _b12
       #define  __Kd_b12   gain_b12_si( 0.0300 )

1090   //rstross2002sep152011 Changing Gains...Loop Tuning!

//rstross2002sep152011 Header Setpoint
       //rstross2002sep191243
       //__v_error_rpm_b0 = 2800/*_v_setpt_rpm_b0*/ - _v_pto_rpm_b0;
1095
       // Calc error
       __v_error_rpm_b0 = _v_setpt_rpm_b0 - _v_pto_rpm_b0;

// PID
1100   _Pcontrol_b12 = ((signed long)__Kp_b12) * __v_error_rpm_b0;
       _integrator_b12 += ( ((signed long)__Ki_b12) * __v_error_rpm_b0 );
       _Icontrol_b12 = _integrator_b12;
       _Dcontrol_b12 = ((signed long)__Kd_b12) * ( __v_error_rpm_b0 - __v_error_prev_rpm_b0 );

1105   _tmp_si = ( (signed int)( ( _Pcontrol_b12 + _Icontrol_b12 + _Dcontrol_b12 + ( ((signed long)_i_offset_ma_b3_s // Clamp negative PID Values to zero
       if( __tmp_si < 0 )
1110      __tmp_si = 0;

_i_out_ma_b3_si = (unsigned int)__tmp_si ;

// Limit Integrator:
1115   // Calc max integrator value:

if( _6_cyl_pto_disc_b_xp )
          __tmp_sl = (((signed long)current_ma_b3_si( 95 ) ) * gain_b9_si( 1.0 ) );     //jpeters2003Jul011533
       else
1120      __tmp_sl = (((signed long)current_ma_b3_si( 150 )) * gain_b9_si( 1.0 ) );     //jpeters2003Jul011533

// Clamp at zero
```

Fig. 43

```
        if( __tmp_sl < 0 )
            __tmp_sl = 0;
1125    // Clamp integrator if required
        if( __integrator_b12 > __tmp_sl )
            __integrator_b12 = __tmp_sl;

// Limit current
1130    if( __i_out_ma_b3_si > __i_max_ma_b3_si )
            __i_out_ma_b3_si = __i_max_ma_b3_si;

//TBD - jpeters2004Aug100923 Do we need to further limit the current based on header type?
        if( _6_cyl_pto_disc_b_xp )
1135    {
            if( __i_out_ma_b3_si > current_ma_b3_si( 110 ) )
                __i_out_ma_b3_si = current_ma_b3_si( 110 );
        }
        else            //_ee_header_type_nbl = sickle
1140    {
            if( __i_out_ma_b3_si > current_ma_b3_si( 150 ) )
                __i_out_ma_b3_si = current_ma_b3_si( 150 );
        }

1145    // Limit velocity:
        //      if( _v_pto_rpm_b0 > __v_MAX_RPM_b0 )
        //          __i_out_ma_b3_si = (__i_out_ma_b3_si * gain_b12_si( 0.95 ) ) / BIN12;

// Save previous error
1150    __v_error_prev_rpm_b0 = __v_error_rpm_b0;
    }

1155 /*****************************************************************/
    unsigned char pto_fwd_on_b_xp( void )
    {
1160    return( __pto_state == _FWD_ON || __pto_state == _VFWD );
    }

/*****************************************************************/
    static signed int __pto_disc_setpt_to_current_ma_b3_si(signed int __setpt_rpm_b0_si)
1165 {
        /*
        DESCRIPTION:    This function returns the predicted current necessary to operate
                        a disc header at the provided header speed with the current engine
                        speed.
1170
                        I = ( Disc / 40 ) + Ioffset + ( (1.5/40)*(2150 - Eng) )

```
       static signed int __temp, __icmd_ma_b3_si;

1175   //   __temp = ( (signed int)( ( (float)(__setpt_rpm_b0_si) ) * BIN3 / 40 ) + EE_pto_fwd_offset_current_ma_b3_si );
            __temp =
              (
1180           (signed int)
               (
                (
                 (
                  __setpt_rpm_b0_si
                 )
1185            )
                 / 5  //(*BIN3/40)
               )
              )
              + EE_pto_fwd_offset_current_ma_b3_si
1190        ;
            //rps2004sep151110...remove rt fp calc...Jeremy Check!!!   //Calculate the nominal current needed at 2150 En
1195   //   if( engine_v_eng_rpm_b0.filtered < 2150 )
            __icmd_ma_b3_si = __temp + (signed int)( ( 2150 - (float)(engine_v_eng_rpm_b0.filtered) )*( 1.5 * BIN3 / 40
            __icmd_ma_b3_si =
              __temp
              + (signed int)
               (
1200            (
                 2150
                 - (unsigned int)(engine_v_eng_rpm_b0.filtered)
                )
1205            * (unsigned char)(1.5 * BIN3)
               )
                / 40
            ;
            //rps2004sep151110...remove rt fp calc...Jeremy Check!!!
1210        else  __icmd_ma_b3_si = __temp;

//jpeters2004Aug311216
            //TBD - Limit test?
1215        return(__icmd_ma_b3_si);
       }

/******************************************************************/
1220   static signed int _pto_draper_setpt_to_current_ma_b3_si()
       {
          /*
          DESCRIPTION:
          */
```

Fig. 45

```
1225    /*
        Damp the engine rpm input to avoid oscillations
        */

1230    __eng_rpm_b0.raw_ul = (unsigned long)engine_v_eng_rpm_b0.filtered;
        LONG_FILTER128( __eng_rpm_b0 )

return( _erpm_to_i((unsigned int) __eng_rpm_b0.filtered_ul));
        }

1235    /******************************************************************/
        static unsigned int _erpm_to_i(unsigned int X)
        (
        /*
1240    Description:
           INPUT:   ERPM
           OUTPUT:  Current
        */
1245    return( UF0XW(FN1, X) );
```

*Fig. 46*

APPARATUS AND METHOD TO CALIBRATE THE PTO WITH THE DISK OR SICKLE OF AN AGRICULTURAL WINDROWER

This application claims the benefit of U.S. Provisional Application No. 60/699,492, filed Jul. 15, 2005.

TECHNICAL FIELD

The present invention relates to agricultural windrowers and, more particularly, to apparatus and a method for calibrating a PTO with the disk or sickle of an agricultural windrower.

BACKGROUND OF THE INVENTION

U.S. Pat. No. 6,901,729, is incorporated herein by reference in its entirety. This patent describes a header flotation system that is referred to as "non-independent". U.S. Provisional Application No. 60/699,492, filed Jul. 15, 2005, is also incorporated herein by reference in its entirety.

A windrower typically consists of a self-propelled tractor or similar vehicle, and a cutting mechanism which is either towed by the tractor or carried thereby. The cutting mechanism carried by a windrower is typically referred to as a header, and is supported on the windrower by forwardly projecting arms. Briefly, the arms comprise elements of a lift and flotation mechanism or mechanisms operable for setting a height of the header above the ground or other surface over which the windrower moves, the flotation permitting the header to ride lightly up and over rises in the terrain during field operation.

Headers are typically available and a variety of configurations. Common elements of different headers include cutters operable for severing crops from the field. One typical cutting mechanism is a sickle cutter which includes a row of knives which extend across the width of the header and which are powered to move reciprocally sidewardly relative to a sidewardly extending array of fixed knives or bars, thereby effecting a cutting action. Another cutting mechanism is a disk cutter including a sidewardly extending array of rotatably driven disks having knives extending radially outwardly from the outer circumferential edges thereof, the rotation of which disks effects the cutting action. Both of these types of cutters may be provided in different overall sideward widths. A typical cutting speed for a sickle type cutter is about 1500 to 1800 strokes per minute, and the for a disk cutter, about 2200 to 3200 rpm. It is typically desirable for the cutters to operate at a constant speed, but, in operation, the cutting speed may vary as a result of changing conditions such as crop population, contact with the ground, or the like. Closed loop speed control is typically used to maintain a consistent cutting speed under varying loads and engine speed changes.

The cutters are powered using a fluid drive, such as a fluid power takeoff (PTO). A pump driven by the engine of the tractor provides pressurized fluid to the PTO system. The pump can be of a fixed displacement, or variable displacement, in the latter instance, the pressurization and direction of fluid flow, and thus the speed and direction of operation of the PTO, being controlled by solenoids. Varying electrical current signals would be utilized for operating the solenoids, for operating the cutters at the desired speed and in the desired direction. In order to achieve maximum response time from the closed loop speed control system, it is desired to eliminate the variations in offset and gain of the electrically controlled pump.

Therefore, it would be desirable to have an apparatus and method which enables calibrating PTO current values on the vehicle, taking into account associated system variances, and furthermore to do this with minimal operator intervention.

SUMMARY OF THE DISCLOSURE

What is disclosed is an apparatus and method which enables calibrating signals for operating a PTO for desired cutter operation using any standard header installed on a windrower, to facilitate optimized closed loop control of the cutter, by automatically deriving the offset and max speed signals.

According to a preferred aspect of the invention the method and apparatus utilizes a programmable control module in connection with at least one signal controlled device operable for controlling operation of the PTO, which signal controlled device is preferably a solenoid controlled pump. The displacement of the pump is variably controllable as a function of the signals, by varying a swash plate angle of the pump. The pump is preferably driven by an engine of the windrower and is thus subject to the effects of varying the engine speed, such as between a low idle speed and a higher operating or harvesting speed. More particularly in this regard, by increasing the engine speed, the pump speed will be increased, and if the swash plate angle is not correspondingly adjusted to decrease the displacement of the pump, the result will be greater pump output. The closed loop speed control will limit the impact of these changes, but its response time is adversely affected if the control loop does not account for offset and gain of the pump electrical control.

To avoid or limit these problems, the control module is programmed as part of an automatic calibration routine for directing control signals to the signal controlled device, here, the solenoid or solenoids controlling the pump, which signals have values which will increase over time from a first value toward a second value. At the same time, or, at an appropriate time during the routine, the control module will monitor a speed sensor of the header, to determine when a first movement of the header, e.g., the cutter, takes place. If the initial movement occurs before the second signal value is reached, the signal value for the first movement is stored. An additional routine is then used to calibrate the electrical current at which the cutter, will be maintained at its maximum speed. In the first instance, if the header speed condition falls outside predetermined limits, the calibration fails.

According to a preferred aspect of the invention, the signals comprise electrical current values within a range anticipated to encompass the current values required for initiating movement or operation of the cutter, and those required for operation of the cutter at maximum operating speed.

The apparatus and method of the invention are adapted for use with a wide variety of windrower header cutters, including disk cutters typically rotatable at speeds of between about 2200 rpm and 3200 rpm, and sickles typically reciprocally operable at speeds of between about 1500 and 1800 cycles per minute.

BRIEF DESCRIPTION OF THE DRAWINGS

The advantages of this invention will be apparent upon consideration of the following detailed disclosure of the invention, especially when taken in conjunction with the accompanying drawings wherein:

FIG. 6 is a written listing of steps of the preferred program of the invention;

FIG. 7 is a written listing of further steps of the preferred program of the invention;

FIG. 8 is a written listing of still further steps of the preferred program of the invention;

FIG. 9 is a written listing of still further steps of the preferred program of the invention; and FIG. 10 is a written listing of still further steps of the preferred program of the invention;

FIG. 11 is a written listing of still further steps of the preferred program of the invention;

FIG. 12 is a written listing of still further steps of the preferred program of the invention;

FIG. 13 is a written listing of still further steps of the preferred program of the invention;

FIG. 14 is a written listing of still further steps of the preferred program of the invention;

FIG. 15 is a written listing of still further steps of the preferred program of the invention;

FIG. 16 is a written listing of still further steps of the preferred program of the invention;

FIG. 17 is a written listing of still further steps of the preferred program of the invention;

FIG. 18 is a written listing of still further steps of the preferred program of the invention;

FIG. 19 is a written listing of still further steps of the preferred program of the invention;

FIG. 20 is a written listing of still further steps of the preferred program of the invention;

FIG. 21 is a written listing of still further steps of the preferred program of the invention;

FIG. 22 is a written listing of still further steps of the preferred program of the invention;

FIG. 23 is a written listing of still further steps of the preferred program of the invention;

FIG. 24 is a written listing of still further steps of the preferred program of the invention;

FIG. 25 is a written listing of still further steps of the preferred program of the invention;

FIG. 26 is a written listing of still further steps of the preferred program of the invention;

FIG. 27 is a written listing of still further steps of the preferred program of the invention;

FIG. 28 is a written listing of still further steps of the preferred program of the invention;

FIG. 29 is a written listing of still further steps of the preferred program of the invention;

FIG. 30 is a written listing of still further steps of the preferred program of the invention;

Figure 31:
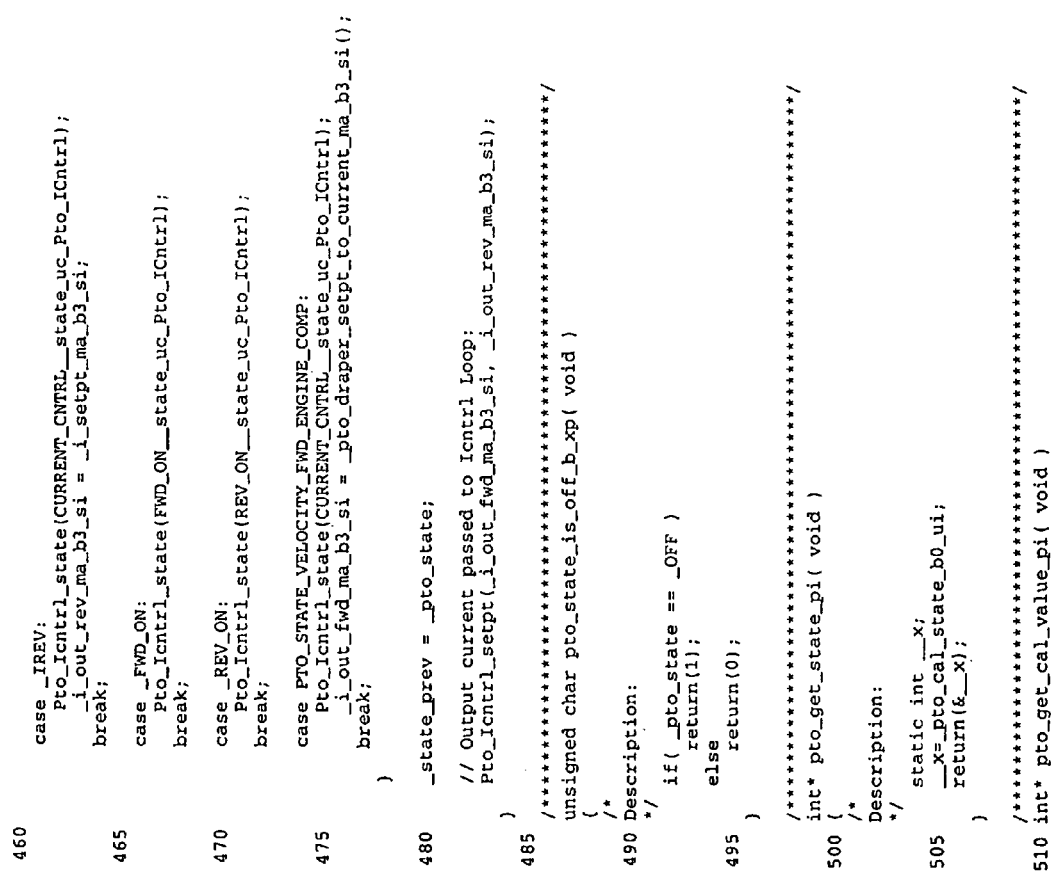

FIG. 31 is a written listing of still further steps of the preferred program of the invention;

FIG. 32 is a written listing of still further steps of the preferred program of the invention;

FIG. 33 is a written listing of still further steps of the preferred program of the invention;

FIG. 34 is a written listing of still further steps of the preferred program of the invention;

FIG. 35 is a written listing of still further steps of the preferred program of the invention;

FIG. 36 is a written listing of still further steps of the preferred program of the invention;

FIG. 37 is a written listing of still further steps of the preferred program of the invention;

FIG. 38 is a written listing of still further steps of the preferred program of the invention;

FIG. 39 is a written listing of still further steps of the preferred program of the invention;

FIG. 40 is a written listing of still further steps of the preferred program of the invention;

FIG. 41 is a written listing of still further steps of the preferred program of the invention;

FIG. 42 is a written listing of still further steps of the preferred program of the invention;

FIG. 43 is a written listing of still further steps of the preferred program of the invention;

FIG. 44 is a written listing of still further steps of the preferred program of the invention;

FIG. 45 is a written listing of still further steps of the preferred program of the invention; and FIG. 46 is a written listing of still further steps of the preferred program of the invention.

DETAILED DESCRIPTION OF THE PREFERRED EMBODIMENTS

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel. Furthermore, the various components shown or described herein for any specific application of this invention can be varied or altered as anticipated by this invention and the practice of a specific application of any element may already by widely known or used in the art by persons skilled in the art and each will likewise not therefore be discussed in significant detail.

Figure 1:
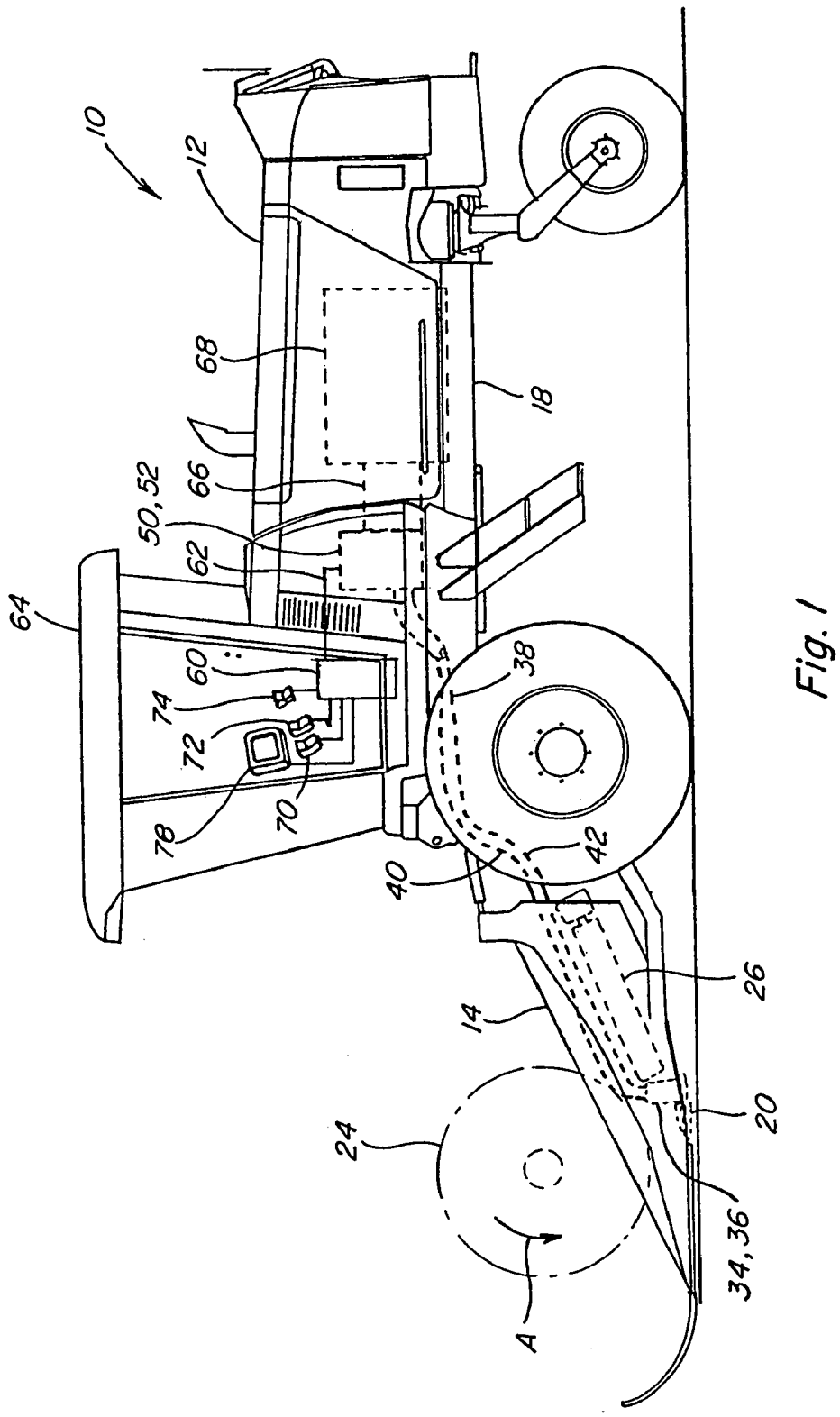
FIG. 1 is a side elevational view of a crop harvesting machine of the type with which the invention may be used, showing a header including a sickle cutter in connection with apparatus of the instant invention.
Figure 2:
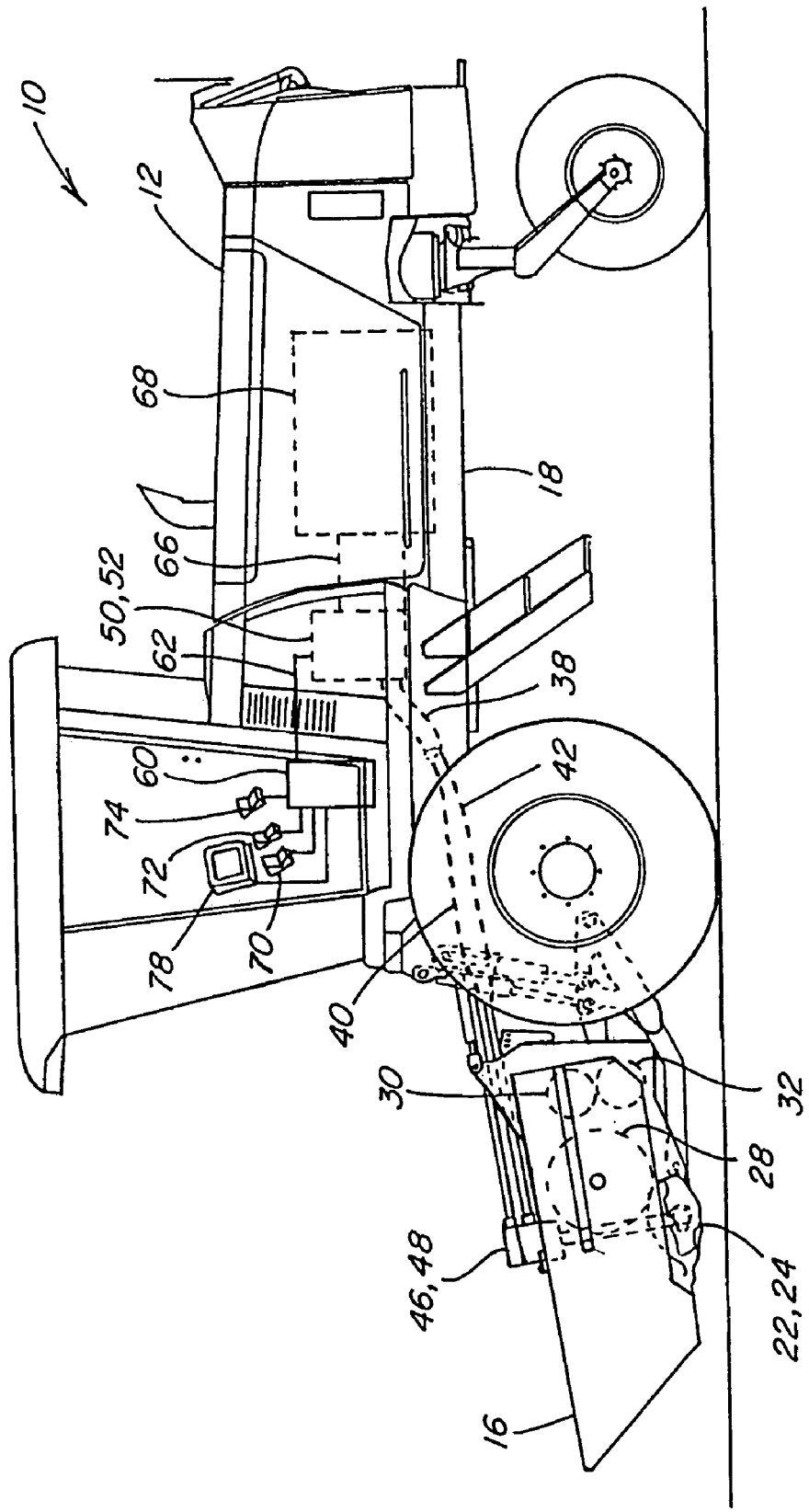
FIG. 2 is another side view of the crop harvesting machine of FIG. 1, showing a header including a disk cutter in connection with apparatus of the instant invention.

FIGS. 1 and 2 show the present invention utilized in connection with a self-propelled windrower 10; however, it will be appreciated that the principles of the present invention are not limited to a self-propelled windrower, or to any specific type of harvesting machine.

In the illustrated embodiment, the self-propelled windrower 10 comprises a tractor 12 and a header 14 (FIG. 1) or 16 (FIG. 2), the header 14 or 16 being attached to the front end of a frame 18 or chassis of the tractor 12. The header may be of generally any suitable construction and design, and will include crop-harvesting mechanisms, such as a sickle cutter 20 (FIG. 1) or a plurality of disk cutters 22 (FIG. 2). Header 14 additionally includes a reel 24 rotatable at a fixed or variable speed, as denoted by arrow A, for directing crops toward header 14 for harvesting by sickle cutter 20. A draper 26 comprising endless belts is disposed and operable for directing the harvested crop toward the center of header 14. Header 16 additionally includes an auger 28 operable for directing harvested crops toward a center of header 16, and counter-rotating conditioner rolls 30 operable for conditioning the harvested crops prior to being deposited onto a field in a windrow.

Sickle cutter 20 of header 14 includes a row of knives extending sidewardly across the lower front of header 14 and reciprocally driven in the sideward direction, by at least one drive 34 which preferably includes a fluid motor 36. Fluid motor 36 is connected in fluid communication with a PTO 38 of tractor 12, by fluid lines 40 and 42, for receiving pressurized fluid therefrom, for powering the reciprocating movement of the sickle knives, in the well known manner. Reel 24 and draper 26 can also be fluid driven, reel 24 by another fluid PTO, and draper 26 also by PTO 38, or they can be separately driven utilizing any desired mechanical drive such as a belt, chain, gear, and/or shaft drive.

Disk cutter 22 of header 16 comprises a plurality of disks 44 arranged in a side-by-side array across the lower front of header 16, each of the disks 44 carrying knives at spaced locations around an outer circumferential periphery thereof. Disks 44 are rotated by a drive 46 in the well known manner, drive 46 preferably including fluid motors 48 operable for driving one or more of disks 44, fluid motors 48 being connected in fluid communication with PTO 38 of tractor 12, by fluid lines 40 and 42, for receiving pressurized fluid therefrom, also in the well known manner.

Headers 14 and 16 are interchangeably mountable on a pair of lower arms which extend forwardly from frame 18 of tractor 12, and which are movable upwardly and downwardly for positioning the header at a desired cutting height, or at an elevated transport position, using one or more lift cylinders (not shown), also in the well known manner. The upper end of the header is connected to frame 18 by an upper or center link connected to a mechanism operable for tilting the header to a desired orientation, again, in the well known manner.

A typical operating speed for the sickle cutter 20 of header 14 will be within a range of from about 1500 cycles per minute to about 1800 strokes per minute, and a typical speed of rotation of disks 44 of disk cutters 22 is within a range of from about 2200 rpm to about 3200 rpm. It is desirable to have a capability to calibrate the output of PTO 38 for optimizing header closed loop speed control performance, hence providing a capability for improved performance, adjusting to changing conditions, particularly changing engine speed.

PTO 38 includes a PTO driveline 50 including a fluid valve arrangement 52 controllably operable for directing pressurized fluid through fluid lines 40 and 42 as desired or required for powering a header, such as header 14 or header 16, connected to windrower 10.

Figure 3:
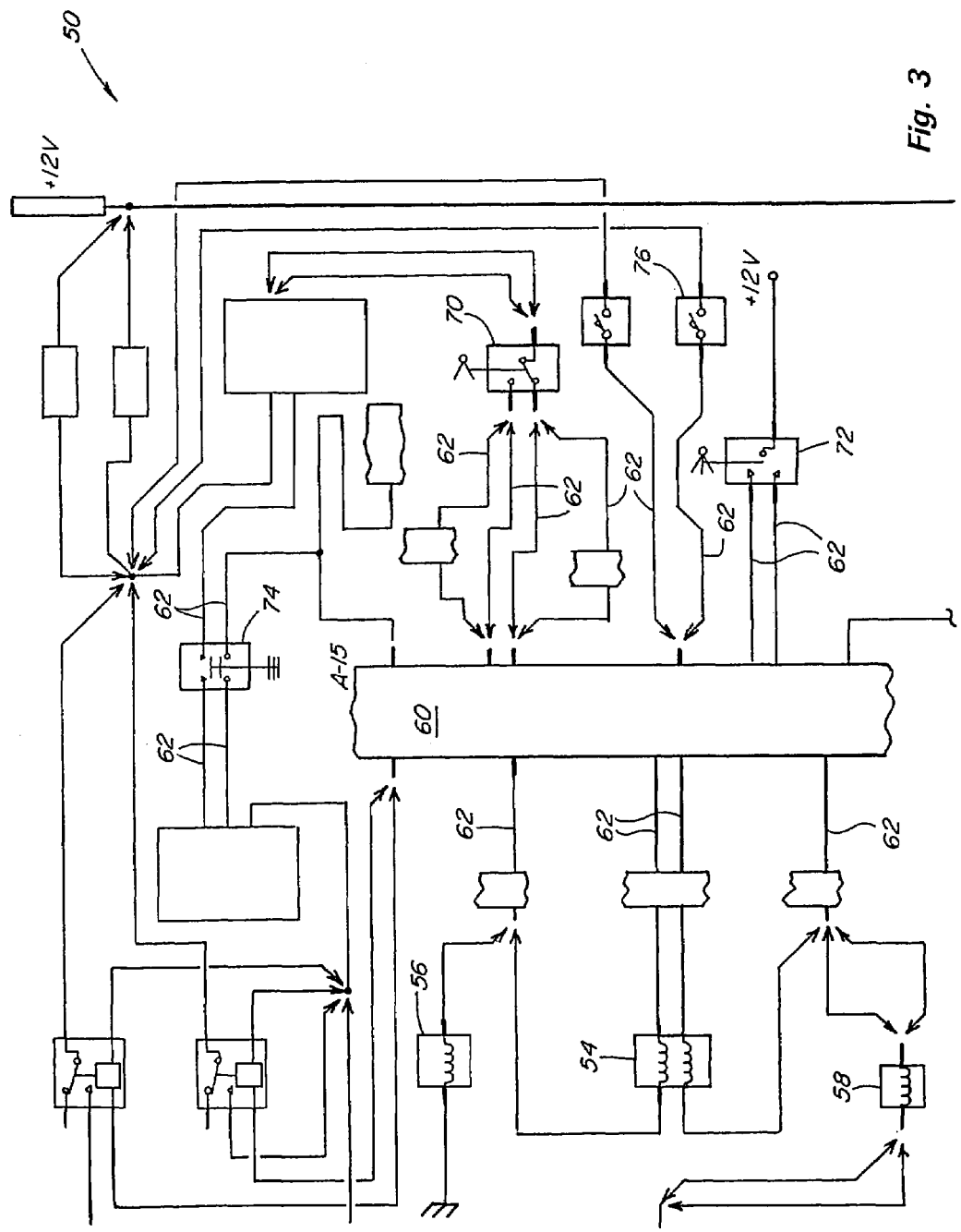
FIG. 3 is a schematic of a PTO driveline of the machine of FIG. 1.

Referring also to FIG. 3, which is a schematic of PTO driveline 50, the flow of pressurized fluid to valve arrangement 52 is generated by a variable displacement pump 66, the displacement of which is determined by the angle of an internal swash plate, the angle being controlled by a header PTO forward/reverse solenoid 54. In another embodiment, the pump can be a fixed displacement pump operated by a header PTO forward solenoid 56 and a header PTO reverse solenoid 58. Solenoid 54 is controlled by an electrical signal, the electrical current value of which can be very precisely controllably varied through a range between zero and a greater amount. PTO driveline 50 includes a programmable control module 60 connected to header PTO forward/reverse solenoid 54 by suitable conductive paths 62, which can be, for instance, wires of a wiring harness. Control module 60 is preferably a conventionally constructed and operable microprocessor based tractor control module, or the like, suitably located on tractor 12, such as in an operator cab 64. Pump 66 is driven by an engine 68 of tractor 12, in the well known manner. Pump 66 is operable for providing fluid pressurized to predetermined system pressure by operation of engine 68 at least a low range speed, which is about 1300 rpm.

Other pertinent elements of PTO driveline 50 include a header PTO switch 70 selectably operable by an operator for selecting a forward or reverse direction of operation of the PTO; a header speed switch 72 selectably operable by an operator for increasing or decreasing the speed of operation of the header; a header PTO emergency stop switch 74; a seat switch 76; and a display device 78, which can be, for instance, an interactive touch screen device or the like which can be automatically adapted or turned on for receiving operator inputs, each of switches 70, 72, 74 and 76, and device 78, being located in operator cab 64 and connected to the control module 60 via suitable conductive paths 62. Electrical power is provided in the normal manner from an electrical system of the tractor, as represented by the +12 V connections in the schematic.

Other aspects of windrower 10 include a propulsion driveline including fluid motors in connection, respectively, with drive wheels, which are differentially operated for effecting steering movements. The differential operation of the fluid motors of the driveline, as well as the travel speed, is effected by varying the displacement of fluid pumps in connection with the respective fluid motors of the driveline. A typical range of operating speeds of engine 68 of windrower 10 will be from about 1300 rpm, which represents a low idle speed, to about 2200 or 2300 rpm, which represents a typical normal operating speed.

Because pump 66 of PTO driveline 50 is driven by engine 68, operation of engine 68 at different speeds will result in operation of pump 66 at different speeds. This will cause pump 66 to generate different fluid flow outputs as the speed of the engine changes, if the displacement of the pump is not correspondingly adjusted for maintaining a particular fluid flow level. As noted above, as an alternative, a close loop speed control is applied to determine an optimal fluid flow for operating a header 14 or 16 installed on windrower 10, then to maintain that optimal fluid flow, regardless of variations in engine speed, that is, to provide a capability to vary the displacement of pump 66 as the speed of engine 68 changes, in a manner for maintaining optimal or near optimal fluid flow conditions. However, the pump 66 has variations from unit to unit which must be taken into account if the closed loop speed control loop is to have an optimize response time.

Figure 4:
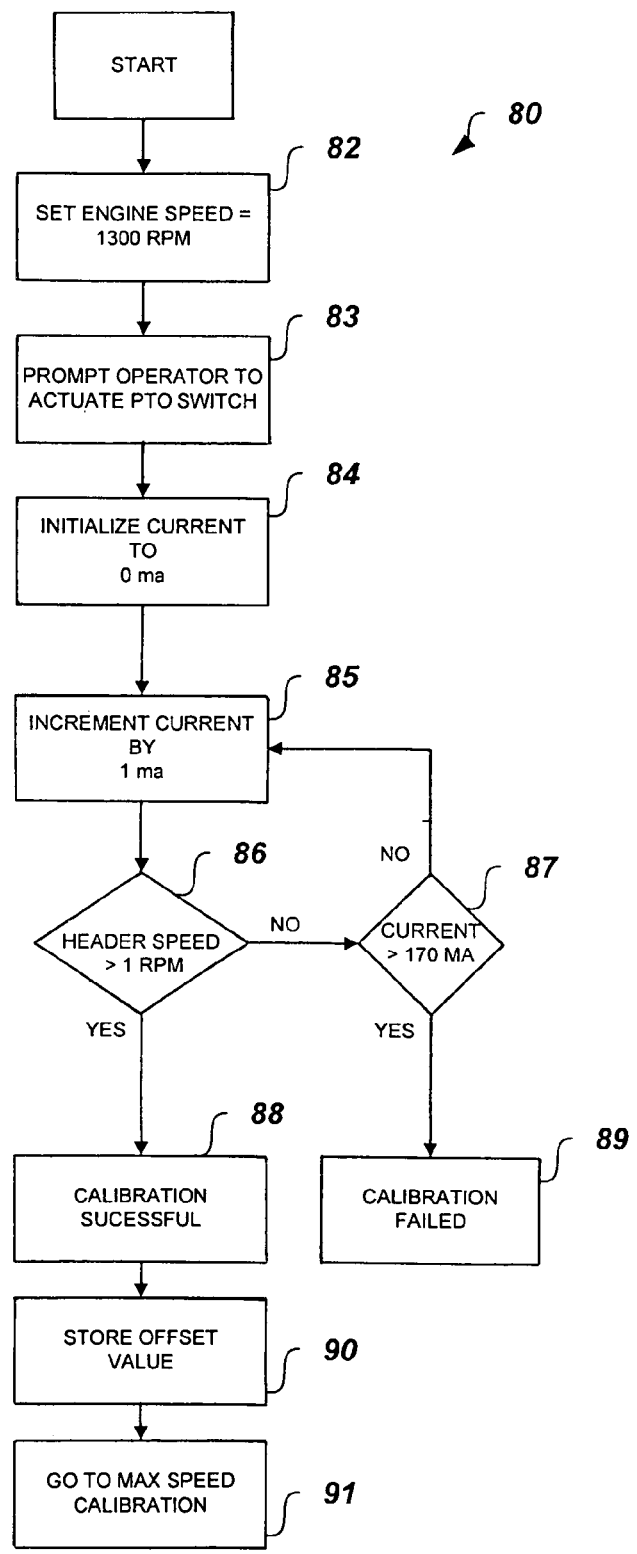
FIG. 4 is a high level flow diagram of steps of a preferred embodiment of a computer program of the invention.
Figure 5:
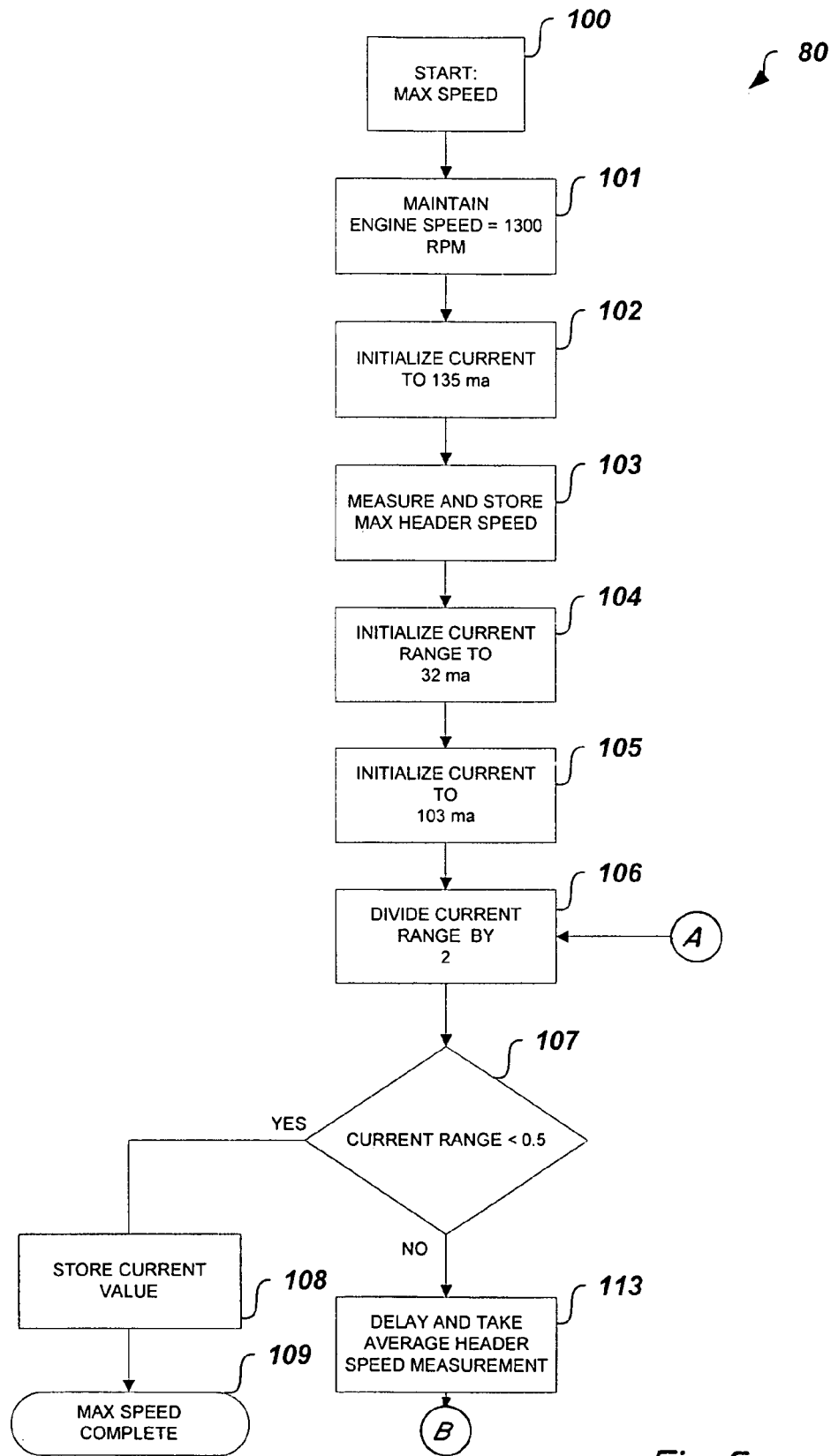
FIG. 5 is another high-level flow diagram of steps of a preferred embodiment of a computer program of the invention.
Figure 5A:
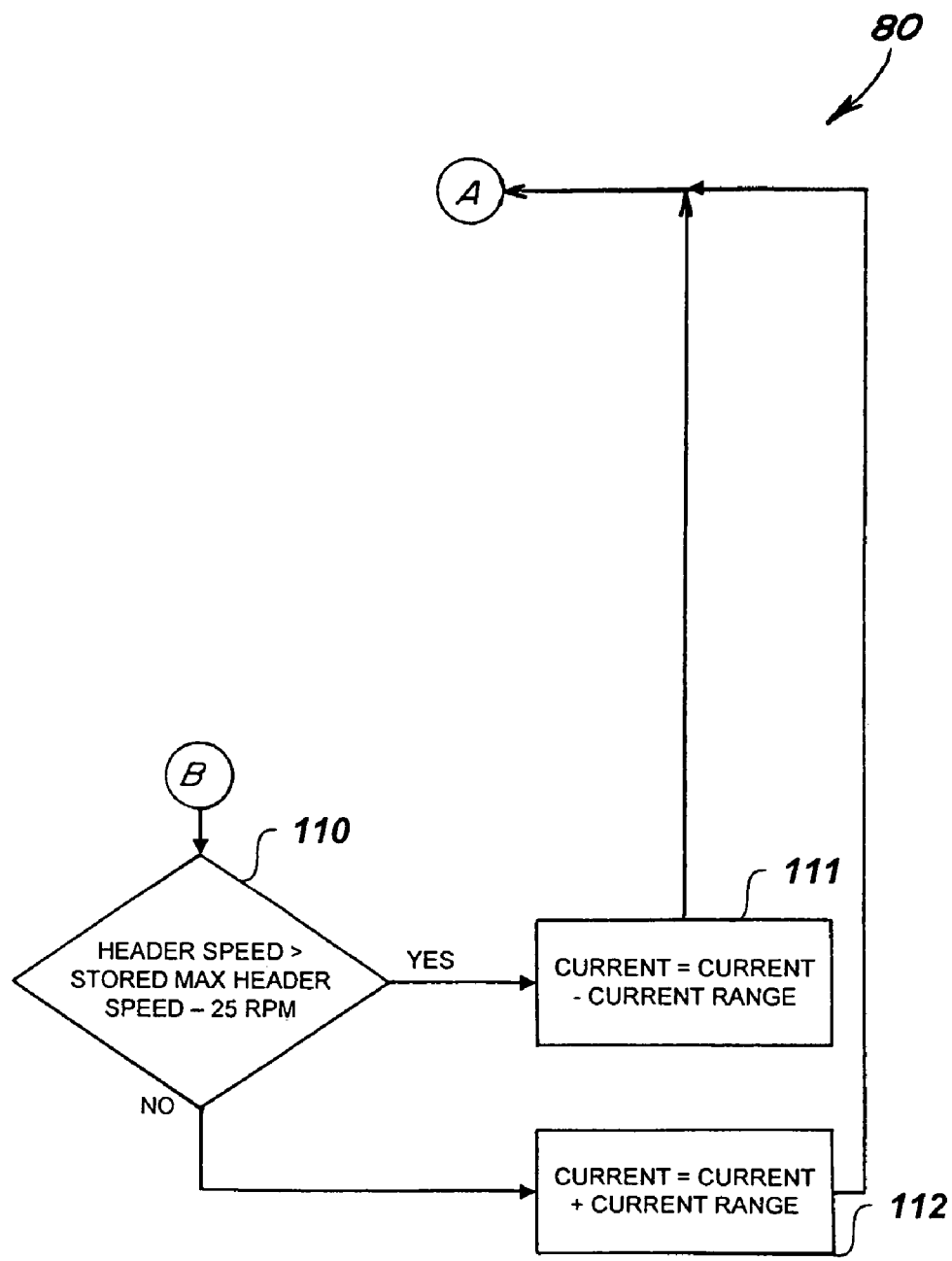
FIG. 5a is a continuation of the flow diagram of FIG. 5.

Referring also to FIGS. 4, 5 and 5a, a flow diagram 80 illustrating steps of a method of the instant invention for calibrating PTO 38 for operation with a header, such as header 14 or header 16, is shown, for determining the fluid flows needed for optimizing the operation of the closed loop speed control, particularly for use in adjusting the displacement of pump 66 responsive to changes in the speed of engine 68. The steps of flow diagram 80 are preferably programmed in and executable by control module 60 at appropriate times, such as, but not limited to, when a pump 66 is first installed, or after a repair or service affecting stored register values. When the operator envokes a calibration, or re-calibration, control module 60 will output a message, denoted by 83, on the screen of display device 78 that calibration is initiating, and request an action by the operator to enable the header 14 or header 16, which will be to operate header PTO switch 70. The calibration routine will then be automatically initiated when the operator has responsively taken the requested action. At block 82 control module 60 initiates an offset calibration routine. This is directed to the initial application of current to the PTO solenoid. Calibration is to be conducted with the fluid system in connection with PTO 38 operating at the normal fluid pressure, which is achieved when engine 68 is operating at least a low idle speed which, for tractor 12, is about 900 rpm for a sickle header 14 or 1300 rpm for a disc header 16. Accordingly, for a disc header 16, control module 60 sets the engine speed equal to 1300 rpm, allows it to settle, and maintains it at that speed, as denoted at block 82. Display device 78 may display a message that the system is in a calibration mode, and warn the operator not to attempt to operate the PTO, and will temporarily disable the PTO switches. Control module 60 then delivers an electrical current signal to the header PTO solenoid 54. Control module 60 increasingly steps the value of the current signal from a first predetermined value of 0 ma, as denoted at block 84, toward a value of 170 ma, as denoted at decision block 87, in 1 ma increments, as denoted at block 85. This range of signal values is used, as it is anticipated that a value within this range will be sufficient for initiating operation of the header cutter. This information can be displayed in a desired form on a screen of display device 78.

Control module 60 will then monitor the output of a speed sensor of the header 14 or 16 for an indication that an initial movement of the cutter has occurred, as denoted by decision block 86.

As the current is stepped, module 60 will monitor the current value of the electrical signal, hold the engine speed steady, and if the speed sensor signal is not received, and the current exceeds the second predetermined value of 170 ma, as determined at decision block 87, module 60 will determine that the calibration has failed, as denoted at block 89. If, at decision block 87, the signal current has not exceeded 170 ma, module 60 will continue stepping the current value upwardly. If, before the current reaches or exceeds 170 ma, the speed signal indicating initial movement of the header is received, module 60 will determine that the offset calibration is successful, as denoted at block 88. Module 60 will then proceed to store the current value corresponding to the initial operation, as denoted at block 90, and proceed to a maximum speed calibration routine, as denoted at block 91.

The maximum speed calibration routine is set forth in FIG. 5, as denoted by block 100. This is directed to determining the electrical current value necessary for operation of the solenoid that produces maximum operating speed thereof. The engine speed is again set or maintained at a speed near low idle, to provide normal fluid system pressure, as denoted at block 101. Module 60 first applies a current sufficient to assure the pump is producing maximum flow, 130 ma as denoted by block 102. The maximum header RPM is measured and stored for further reference, as denoted by block 103. Module 60 will then step the current signal delivered to the header PTO solenoid 54 or 56 with which the PTO is equipped. In this routine, control module 60 steps the value of the current signal using a binary tree algorithm. Control module 60 must first initialize two variables associated with the binary tree algorithm. The first variable being the electrical current range, initialized to 32 ma as denoted by block 104. The second being the electrical current value, initialized to 103 ma, as denoted by block 105. The electrical current range is then divided in half, as denoted by block 106. The electrical current range is compared to the minimum electrical current resolution required, 0.5 ma as denoted by block 107. The header speed is allowed to settle and an average measurement of header speed is compared to the maximum header speed measured, less 25 RPM, as denoted by decision block 110. If the latest average measurement of header speed, corresponding to the applied current, exceeds the stored maximum header speed, the current will be reduced by the value of the electrical current range, as denoted by block 111. If the latest average measurement of header speed, corresponding to the applied current, is less than or equal to the stored maximum header speed less 25 RPM, the current will be increased by the value of the electrical current range, as denoted by block 111. The process then repeats, starting at block 106 until the electrical current range is less than the minimum electrical current range resolution, 0.5 ma, as denoted by block 107. When the minimum electrical current range resolution requirement is met, the electrical current value, corresponding to maximum header speed less 25 RPM, is stored as denoted by block 108.

Control module 60 can additionally be programmed for calibrating header PTO forward/reverse solenoid 54 in the reverse operating mode, using the above routines for offset and/or maximum speed calibration.

As a result of execution of the calibration routines of the instant invention, registers of control module 60 will contain information representative of the electrical current value required to be directed to solenoid 54 for providing fluid flow for effecting initial operation of the cutter of the presently mounted header 14 or 16, and for providing the fluid flow for operation of the cutter at the target normal or maximum operating speed thereof. These values can then be used by control module 60, for determining new current values for achieving pump swash plate angles required for providing the optimal fluid flow to the header for a variety of engine speeds, using well know closed loop speed control algorithms. If, after calibration the pump is changed, the calibration routine will be repeated. In this instance, the previous calibration values can be discarded by the control module.

Referring also to FIGS. 6-46, lines of code of an actual computer program embodying the above described steps of the method of the invention is disclosed. The notes accompanying the lines of code describe many features of the method of the invention.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the inventions. Accordingly, the following claims are intended to protect the invention broadly as well as in the specific form shown.

What is claimed is:

1. A method of calibrating a PTO for driving a cutter of a header of an agricultural windrower, comprising steps of:
   providing a windrower including a PTO having a fluid pump operable by a signal controlled device for controlling pressurized fluid flow through the PTO to a cutter of a header for controlling a speed of operation of the cutter;
   providing a programmable control module in connection with the signal controlled device and operable for outputting control signals thereto having variable signal values; and
   wherein the control module is programmed as part of a calibration routine for automatically:
   outputting control signals to the signal controlled device having signal values which will increase over time from a first predetermined value toward a second predetermined value;
   monitoring the header for an indication of initial movement of the cutter; and
   if the indication of the initial movement of the cutter is present, then storing information representative of a signal value outputted to the signal controlled device corresponding to the initial movement of the cutter; and if the values of the signals outputted to the signal controlled device are increased to the second predetermined value and the indication is not present, then determining that the calibration fails.

2. The method of claim 1, wherein the signal values comprise electrical currents.

3. The method of claim 1, wherein the first predetermined value comprises about 0 ma, and the second predetermined value comprises a value of about 170 ma.

4. The method of claim 1, wherein as the control module directs the signals to the signal controlled device, the control module will automatically hold an engine speed of the windrower substantially constant.

5. The method of claim 1, wherein the control module is programmed as part of the calibration routine to automatically execute further steps comprising:

if the information representative of a signal value outputted to the signal controlled device corresponding to the initial movement of the cutter has been stored, then directing further signals to the signal controlled device having signal values which will increase over time from a third predetermined value toward a fourth predetermined value; and monitoring the header for an indication of movement of the cutter at a predetermined speed; and if the indication of movement of the cutter at the predetermined speed is present, then storing information representative of a signal value outputted to the signal controlled device corresponding to the movement of the cutter at the predetermined speed; and if the values of the signals outputted to the signal controlled device are increased to the fourth predetermined value and the indication of movement of the cutter at the predetermined speed is not present, then determining that the calibration fails.

6. The method of claim 5, wherein the third predetermined value comprises a value of about 103 ma, and the fourth predetermined value comprises a value of about 135 ma.

7. The method of claim 5, wherein the cutter comprises a disk cutter, and the predetermined speed comprises a value within a range of from about 2200 rpm to about 3200 rpm.

8. The method of claim 5, wherein the cutter comprises a sickle cutter, and the predetermined speed comprises a value within a range of from about 1500 strokes per minute to about 1800 strokes per minute.

9. Apparatus for calibrating a PTO of an agricultural windrower for driving a cutter of a header of the windrower, comprising:

a PTO driveline having at least one solenoid controlled pump operable by an electrical signal for controlling pressurized fluid flow through the pump to a cutter of a header for controlling a speed of operation of the cutter;

a programmable control module in connection with the at least one solenoid in connection with the pump and with a source of electricity, the control module being operable for controllably directing an electrical signal having a variable signal value from the source of electricity to the solenoid;

an input device in connection with the control and operable by an operator for inputting a predetermined signal thereto; and wherein the control module is programmed as part of a calibration routine to automatically:

direct electrical signals to the solenoid having values which will increase over time from a first predetermined value toward a second predetermined value, and, as the electrical signals are directed to the solenoid, determining if a first movement of the cutter occurs, and if the first movement of the cutter occurs before the electrical signals directed to the solenoid are increased to the second predetermined value, then store information representative of an electrical signal directed to the solenoid corresponding to the first movement of the cutter, and if the electrical signals directed to the solenoid are increased to the second predetermined value and the first movement of the cutter has not occurred, then to determine that the calibration has failed.

10. Apparatus of claim 9, wherein the electrical signal values comprise electrical currents.

11. Apparatus of claim 9, wherein the first predetermined value comprises a value of about 0 ma, and the second predetermined value comprises a value of about 170 ma.

12. Apparatus of claim 9, wherein as the control module directs the electrical signals to the solenoid, the control module will automatically hold an engine speed of the windrower substantially constant.

13. Apparatus of claim 9, wherein the control module is programmed as part of the calibration routine to automatically direct further electrical signals to the solenoid having values which will increase over time from a third predetermined value toward a fourth predetermined value if the information representative of the electrical signal directed to the solenoid corresponding to the first movement of the cutter has been stored, and determining if movement of the cutter at a predetermined speed occurs, and if the movement of the cutter at the predetermined speed occurs before the electrical signals directed to the solenoid are increased to the fourth predetermined value, then store information representative of an electrical signal directed to the solenoid corresponding to the movement of the cutter at the predetermined speed.

14. Apparatus of claim 13, wherein the third predetermined value comprises a value of about 103 ma, and the fourth predetermined value comprises a value of about 135 ma.

15. Apparatus of claim 13, wherein the cutter comprises a disk cutter, and the predetermined speed comprises a value within a range of from about 2200 rpm to about 3200 rpm.

16. Apparatus of claim 13, wherein the cutter comprises a sick cutter, and the predetermined speed comprises a value within a range of from about 1500 strokes per minute to about 1800 strokes per minute.

* * * * *